United States Patent
Wang et al.

(10) Patent No.: US 12,481,326 B2
(45) Date of Patent: Nov. 25, 2025

(54) PIVOTABLE SUPPORT APPARATUS AND DISPLAY APPARATUS

(71) Applicant: BOE Technology Group Co., Ltd., Beijing (CN)

(72) Inventors: Xinyu Wang, Beijing (CN); Yonghong Zhou, Beijing (CN); Shangchieh Chu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/788,589

(22) PCT Filed: Sep. 24, 2021

(86) PCT No.: PCT/CN2021/120301
§ 371 (c)(1),
(2) Date: Mar. 30, 2023

(87) PCT Pub. No.: WO2023/044750
PCT Pub. Date: Mar. 30, 2023

(65) Prior Publication Data
US 2024/0176395 A1    May 30, 2024

(51) Int. Cl.
*G06F 1/16* (2006.01)
(52) U.S. Cl.
CPC .......... *G06F 1/1656* (2013.01); *G06F 1/1616* (2013.01); *G06F 1/1681* (2013.01)
(58) Field of Classification Search
None
See application file for complete search history.

(56) References Cited

U.S. PATENT DOCUMENTS 8,720,011 B1 * 5/2014 Hsu ..................... G06F 1/1681
16/354
10,659,576 B1 * 5/2020 Hsu ..................... G06F 1/1624
(Continued)

FOREIGN PATENT DOCUMENTS

CN    108738258 A    11/2018
CN    109215508 A    1/2019
(Continued)

OTHER PUBLICATIONS

International Search Report & Written Opinion mailed Jun. 17, 2022, regarding PCT/CN2021/120301.
(Continued)

*Primary Examiner* — Imani N Hayman
*Assistant Examiner* — Rashen E Morrison
(74) *Attorney, Agent, or Firm* — Intellectual Valley Law, P.C.

(57) ABSTRACT

A pivotable support apparatus for supporting a foldable display panel is provided. The pivotable support apparatus includes a binge structure; and a joint structure including at least me row of joints, a respective row of joints comprising a plurality of joints connected to each other. A respective joint of the plurality of joints includes an upper portion and a lower portion. Contacts respectively between respective first upper side surfaces of respective upper portions of respective first adjacent joints and respective second upper side surfaces of respective upper portions of respective second adjacent joints define a limit to which the pivotable support apparatus can be unfolded.

18 Claims, 30 Drawing Sheets

(56) References Cited

U.S. PATENT DOCUMENTS

| | | | |
|---|---|---|---|
| 11,635,789 B2* | 4/2023 | Shibayama | G06F 1/1618 361/679.27 |
| 2008/0289146 A1* | 11/2008 | Chen | E05D 3/186 16/372 |
| 2016/0179236 A1* | 6/2016 | Shin | H04M 1/0216 345/173 |
| 2018/0101200 A1* | 4/2018 | Myeong | G09F 9/301 |
| 2018/0275725 A1* | 9/2018 | Lin | H04M 1/0268 |
| 2018/0341295 A1* | 11/2018 | Lan | G06F 1/1616 |
| 2019/0012028 A1 | 1/2019 | Park | |
| 2019/0069421 A1 | 2/2019 | Lee | |
| 2020/0166969 A1 | 5/2020 | Lee et al. | |
| 2021/0059059 A1 | 2/2021 | Pai et al. | |

FOREIGN PATENT DOCUMENTS

| | | |
|---|---|---|
| CN | 109308846 A | 2/2019 |
| CN | 109451114 A | 3/2019 |
| CN | 110242663 A | 9/2019 |
| CN | 111140591 A | 5/2020 |
| CN | 111210722 A | 5/2020 |
| CN | 211429359 U | 9/2020 |
| CN | 112217922 A | 1/2021 |
| WO | 2015093801 A1 | 6/2015 |
| WO | 2021118538 A1 | 6/2021 |

OTHER PUBLICATIONS

First Office Action in the Chinese Patent Application No. 202180002669.2, dated May 29, 2025; English translation attached.

* cited by examiner

PIVOTABLE SUPPORT APPARATUS AND DISPLAY APPARATUS

CROSS-REFERENCE TO RELATED APPLICATION

This application is a national stage application under 35 U.S.C. § 371 of International Application No. PCT/CN2021/120301, filed Sep. 24, 2021, the contents of which are incorporated by reference in the entirety.

TECHNICAL FIELD

The present invention relates to display technology, more particularly, to a pivotable support apparatus and a display apparatus.

BACKGROUND

Portable display devices such as foldable and flexible display devices have become a focus of research and development in display technology in recent years. A flexible display device is a bendable or deformable display device having a flexible display panel. Examples of flexible display devices include s flexible organic light emitting display (OLED) device, a flexible electrophoretic display (EPD) device, and a flexible liquid crystal display (LCD) device. As a new generation display device, the flexible display device is thinner and tighter, having high contrast, high responsiveness, and high brightness. It also provides full color and a wide viewing angle. The flexible display device has found a wide range of applications is mobiles phones, personal digital assistance (PDAs), digital cameras, on-board displays, notebook computers, on-wall televisions, as well as various military applications. A flexible display device includes a flexible array substrate. A base substrate of the flexible array substrate can be made of flexible material such as plastic.

SUMMARY

In one aspect, the present disclosure provides a pivotable support apparatus for supporting a foldable display panel, comprising a binge structure comprising a first shaft and a second shaft respectively providing a first rotational axis and a second rotational axis parallel to each other; and a joint structure comprising at least one row of joints, a respective row of joints comprising a plurality of joints connected to each other; wherein, in a folded state of the pivotable support apparatus, the respective row of joints curves around the hinge structure; and wherein, a respective joint of the plurality of joints comprises aw upper portion and a lower portion, the upper portion being on a side of the lower portion away from the hinge structure; the upper portion comprises an upper surface, a first upper side surface, and a second upper side surface; and contacts respectively between respective first upper side surfaces of respective upper portions of respective first adjacent joints of the plurality of joints ad respective second upper side surfaces of respective upper portions of respective second adjacent joints of the plurality of joints define a limit to which the pivotable support apparatus can be unfolded.

Optionally, in aw unfolded state of the pivotable support apparatus, upper surfaces of upper portions of the plurality of joints are substantially co-planar; and a respective first upper side surface of a respective upper portion of a respective first adjacent joint is in contact with a respective second upper side surface of a respective upper portion of a respective second adjacent joint.

Optionally, the lower portion comprises a lower surface, a first lower side surface, and a second lower side surface; and contacts respectively between respective first lower side surfaces of respective lower portions of the respective first adjacent joists and respective second lower side surfaces of respective lower portions of the respective second adjacent joints define a limit to which the pivotable support apparatus can be folded.

Optionally, in the folded state of the pivotable support apparatus, upper surfaces of upper portions of the plurality of joints form portions of a curved surface; and a respective first lower side surface of a respective lower portion of a respective first adjacent joint is in contact with a respective second lower side surface of a respective lower portion of a respective second adjacent joint.

Optionally, the pivotable support apparatus further comprises a first rotating plate and a second rotating plate; wherein the first shaft is configured to rotate as the first rotating plate rotates, the second shaft is configured to rotate as the second rotating plate rotates; and wherein in the folded state of the pivotable support apparatus, the first rotating plate and the second rotating plate are cooperatively configured to form a curved surface, the respective row of joints is configured to be at least partially supported by the curved surface.

Optionally, the first rotating plate comprises a first main body and a first connecting disc protruding from a first side surface of the first main body; the second rotating plate comprises a second main body and a second connecting disc protruding from a second side surface of the second main body; the first rotating plate comprises a fast hole extending through the first connecting disc, the first shaft extending through the first hole to connect the fast rotating plate with the first shaft; and the second rotating plate comprises a second hole extending through the second connecting disc, the second shaft extending through the second hole to connect the second rotating plate with the second shaft.

Optionally, the joint structure comprises a first row of joists and a second row of joists; and in the folded state of the pivotable support apparatus, the first row of joints is at least partially supported by the first connecting disc, the second row of joists is at least partially supported by the second connecting disc.

Optionally, the lower portion comprises a lower surface, a first lower side surface, and a second lower side surface; and in the folded state of the pivotable support apparatus, lower surfaces of joints in the first row of joints is not in contact with the second connecting disc, and lower surfaces of joints in the second row of joints is not in contact with the first connecting disc.

Optionally, the pivotable support apparatus further comprises a first support plate and a second support plate; wherein the first shaft is configured to rotate as the first support plate and the first rotating plate rotate, the second shaft is configured to rotate as the second support plate and the second rotating plate rotate; and two opposite ends of the respective row of joints are respectively attached to the first support plate and the second support plate.

Optionally, the first rotating plate comprises a first main body and a first correcting disc protruding from a first side surface of the first main body; the second rotating plate comprises a second main body and's second connecting disc protruding from a second side surface of the second main body; the first main body comprises a third side surface connected to the first side surface, the third side surface at least partially supporting the first support plate; and the second main body comprises a fourth side surface connected to the second side surface the fourth side surface at least partially supporting the second support plate.

Optionally, the first rotating plate and the first support plate are configured to move relative to each other as the first rotating plate rotates about the first rotational axis; and the second rotating plate and the second support plate are configured to move relative to each other as the second rotating plate rotates about the second rotational axis.

Optionally, the pivotable support apparatus further comprises a first mount and a second mount; wherein the first rotating plate comprises a first slot, the first support plate comprises a second slot, the first mount extends through the first slot and at least partially into the second slot; the second rotating plate comprises a third slot, the second support plate comprises a fourth slot, the second mount extends through the third slot and at least partially into the fourth slot; the first slot and the second slot limit a movement of the first mount in a, space provided by the first slot and the second slot; and the third slot and the fourth slot limit a movement of the second mount in a space provided by the third slot and the fourth slot.

Optionally, the pivotable support apparatus further comprises a first sliding plate mounted onto the first rotating plate and a second sliding plate mounted onto the second rotating plate.

Optionally, the pivotable support apparatus further comprises a first rotating rod and a second rotating rod; the first rotating rod comprises a first rod main body, a first limiting post, a second limiting post, and a third limiting post, wherein the second limiting post protrudes how a side of the first rod main body opposite to a side from which the first limiting post and the third limiting post protrude; the second rotating rod comprises a second rod mass body, a fourth limiting post, a fifth limiting post, and a sixth limiting post, wherein the fifth limiting post protrudes from a side of the second rod main body opposite to a side from which the fourth limiting post and the sixth limiting post protrude; the first rotating plate comprises a first receiving slot configured to receive at least the first rod main body, and the second rotating plate comprises a second receiving slot configured to receive at least the second rod main body.

Optionally, the first rotating plate father comprises a first dent inside a region of the first receiving slot, the first dent configured to receive the first limiting post, the first limiting post extending at least partially into the first dent, thereby connecting the first limiting post to the first rotating plate; and the second rotating plate further comprises a second dent inside a region of the second receiving slot, the second dent configured to receive the fourth limiting post, the fourth limiting post extending at least partially into the second dent, thereby connecting the fourth limiting post to the second rotating plate.

Optionally, the first support plate comprises a first post hole configured to receive the second limiting post, the second limiting post extends at least partially into the first post bole thereby connecting the second limiting post to the first support plate; and the second support plate comprises a second post hole configured to receive the fifth limiting post, the fifth limiting post extends at least partially into the second post hole thereby connecting the fifth limiting post to the second support plate.

Optionally, the first sliding plate comprises a third post hole configured to receive the third limiting post; the first rotating plate further comprises a first groove inside a region of the first receiving slot; the third limiting post extends through the first groove and at least partially into the third post hole, the first groove configured to allow movement of the third limiting post in a space provided by the first groove; the second sliding plate comprises a fourth post bole configured to receive the sixth limiting post; the second rotating plate further comprises a second groove inside a region of the second receiving slot, and the sixth limiting post extends through the second groove and at least partially into the fourth post bole, the second groove configured to allow movement of the sixth limiting post in a space provided by the second groove.

Optionally, the first sliding plate comprises a first sliding groove and a second sliding groove facing each other; the second sliding plate comprises a third sliding groove and a fourth sliding groove facing each other; the first shading groove and the second sliding groove are configured to respectively receive two portions of the first rotating plate, allowing the first rotating plate to move relatively to the first sliding plate; and the third sliding groove and the fourth sliding groove are configured to respectively receive two portions of the second rotating plate, allowing the second rotating plate to move relatively to the second sliding plate.

Optionally, the pivotable support apparatus further comprises a frame securely attached to the first sliding plate and the second sliding plate.

Optionally, the pivotable support apparatus further comprises a first cam bar, a second cam bar; and a cam comprising a first notch, a second notch, a third notch, and a fourth notch; wherein, in an unfolded state of the pivotable support apparatus, the first cam bar is configured to be engaged with the first notch, and the second cam bar is configured to be engaged with the second notch; and in the folded state of the pivotable support apparatus, the first cam bar is configured to be engaged with the third notch, and the second cam bar is configured to be engaged with the fourth notch.

Optionally, the pivotable support apparatus further comprises a first cam bar retainer comprising a first spring, and a second cam bar retainer comprising a second spring; the first spring is configured to apply a force to the first cam bar to maintain the first cam bar in contact with the cam; the second spring is configured to apply a force to the second cam bar to maintain the second cam bar in contact with the cam; the cam comprises a first bump positioned between the first notch and the third notch, and a second bump positioned between the second notch and the fourth notch; and during a movement between the folded state and the unfolded state of the pivotable support apparatus, the first cam bar is in contact with and gliding on a surface of the first bump, the second cam bar is in contact with and gliding on a surface of the second bump, thereby damping the movement of the pivotable support apparatus.

Optionally, the pivotable support apparatus further comprises a resilient support, wherein the resilient support comprises a resilient material layer and a plurality of rigid support bars on a side of the resilient material layer closer to the first shaft and the second shaft; and a fastener on a side of the first shaft and the second shaft away from the plurality of rigid support bars; wherein the resilient support comprises a support post configured to engage with the fastener to secure the resilient support.

Optionally, the pivotable support apparatus further comprises a frame on a side of the resilient material layer away from plurality of rigid support bars; wherein the frame comprises a plurality of positioning posts, the resilient material layer comprises a plurality of positioning boles, the plurality of positioning posts being configured to respectively engage with the plurality of positioning boles to secure the resilient support with respect to the frame.

Optionally, the pivotable support apparatus further comprises a first rotating plate, a second rotating plate, and a cover at least partially covering the first rotating plate and the second rotating plate; wherein the cover comprises cover positioning posts, the first rotating plate and the second rotating plate comprises rotating plate positioning boles, the cover positioning posts being configured to engaged with the rotating plate positioning holes to secure the cover onto the first rotating plate and the second rotating plate.

Optionally, the pivotable support apparatus further comprises a first cam bar, and a second cam bar; wherein the cover comprises cover positioning holes configured to engage with the first cam bar and the second cam bar.

Optionally, the pivotable support apparatus further comprises a flexible film attached on the cover.

Optionally, the pivotable support apparatus further comprises a synchronized gear configured to synchronize rotation of the first shaft and the second shaft.

Optionally, the pivotable support apparatus further comprises a triangular plate; wherein the triangular plate comprises a first plate bole, a second plate bole, and a third plate bole; the first shaft extends through the first plate bole; the second shaft extends through the second plate bole; and a pix connecting two adjacent joints of the plurality of joists extends through the third plate bole.

Optionally, the pivotable support apparatus further comprises a torque plate configured to be overfitted with the first shaft and the second shaft, thereby damping a rotation of the pivotable support apparatus.

In another aspect, the present disclosure provides a display apparatus, comprising a folding display panel and a pivotable support apparatus described herein or fabricated by a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a pivotable support apparatus for supporting a foldable display panel, and a display apparatus that substantially obviate one or more of the problems due to limitations and disadvantages of the related art. In one aspect, the present disclosure provides a pivotable support apparatus for supporting a foldable display panel. In some embodiments, the pivotable support apparatus includes a binge structure comprising a fast shaft and a second shaft respectively providing a first rotational axis and a second rotational axis parallel to each other; and a joint structure comprising at least one row of joints, a respective row of joints comprising a plurality of joints connected to each other. Optionally, is a folded state of the pivotable support apparatus, the respective row of joists curves around the binge structure. Optionally, a respective joist of the plurality of joints comprises an upper portion and a lower portion, the upper portion being on a side of the lower portion away from the hinge structure. Optionally the upper portion comprises an upper surface, a first upper side surface, and a second upper side surface. Optionally contacts respectively between respective first upper side surfaces of respective upper portions of respective first adjacent joints of the plurality of joints and respective second upper side surfaces of respective upper portions of respective second adjacent joints of the plurality of joists define a limit to which the pivotable support apparatus can be unfolded.

Figure 1A:
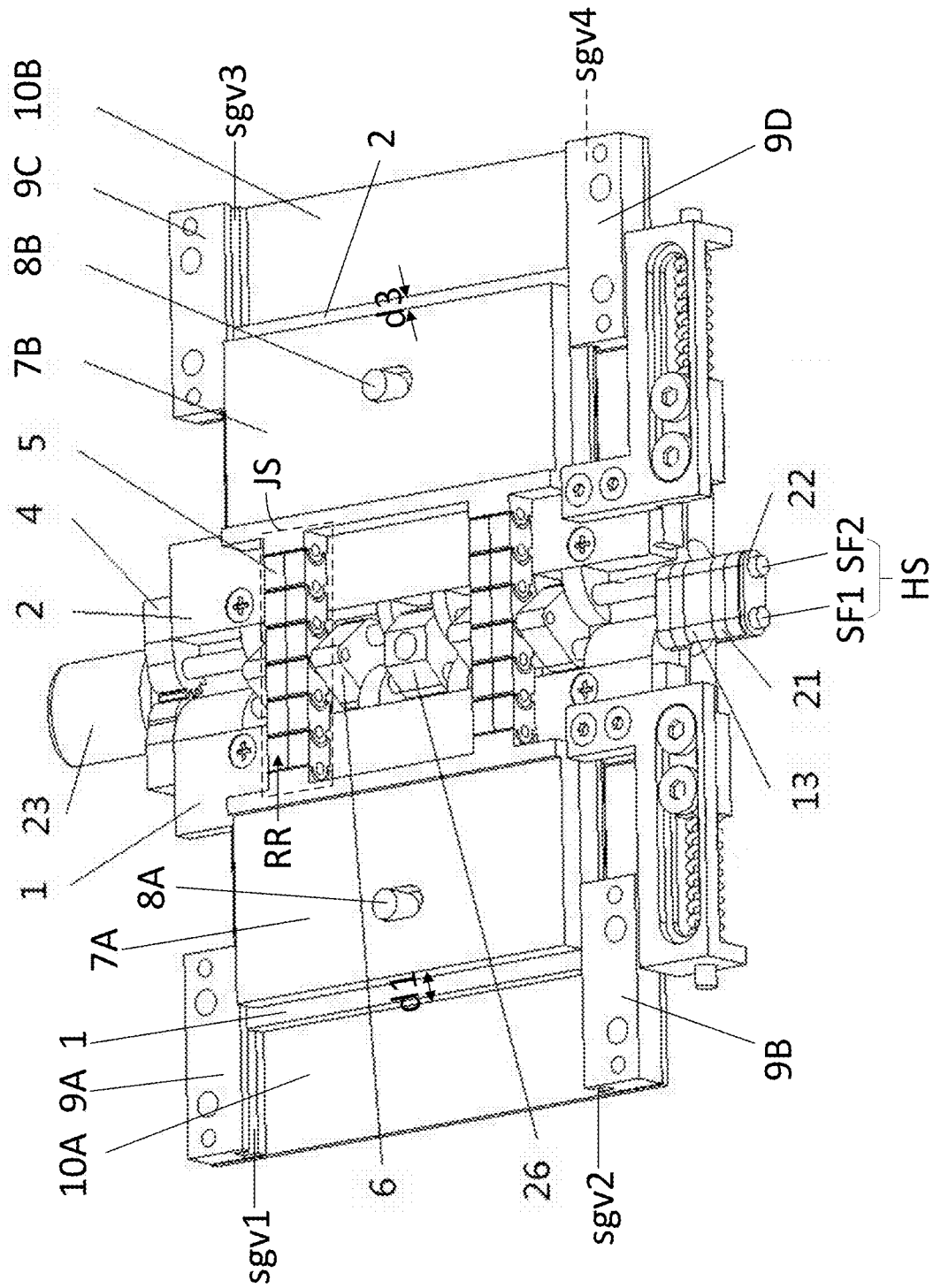
FIG. 1A is a font view of a pivotable module in some embodiments according to the present disclosure.
Figure 1B:
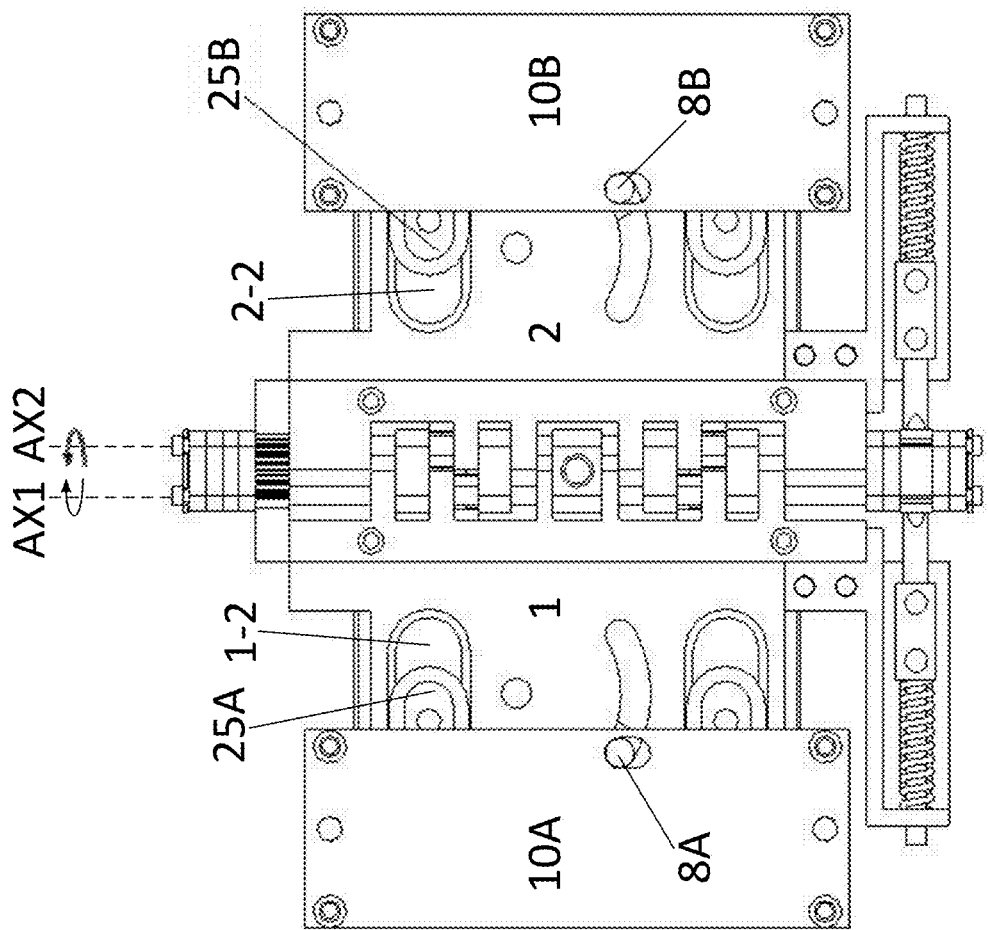
FIG. 1B is a back view of a pivotable module is some embodiments according to the present disclosure.

In some embodiments, the pivotable support apparatus includes at least one pivotable module. In one example, the pivotable support apparatus includes one single pivotable module. In another example, the pivotable support apparatus includes two pivotable modules. In another example, the pivotable support apparatus includes three or more pivotable modules. FIG. 1A is a four view of a pivotable module in some embodiments according to the present disclosure. FIG. 1B is a back view of a pivotable module in some embodiments according to the present disclosure. Referring to FIG. 1A and FIG. 1B, the pivotable support apparatus (for example, in a respective pivotable module) includes a binge structure HS and a joint structure JS. The binge structure HS includes a fast shaft SF1 and a second shaft SF2 respectively providing a first rotational axis AX1 and a second rotational axis AX2 parallel to each other. The joist structure IS includes at least que row of joints, a respective row RR of joints includes a plurality of joints 5 connected to each other. In one example, the plurality of joints 5 are connected to each other by pins respectively connecting adjacent joints. In FIG. 1A, the joint structure JS includes four rows of joints in two groups. The first group includes two adjacent rows arranged side-by-side, and the second group also includes two adjacent rows arranged side-by-side. The two groups are spaced apart from each other.

Referring to FIG. 1A, the pivotable support apparatus in some embodiment further includes a synchronized gear 4 configured to synchronize rotation of the first shaft SF1 and the second shaft SF2.

Figure 2A:
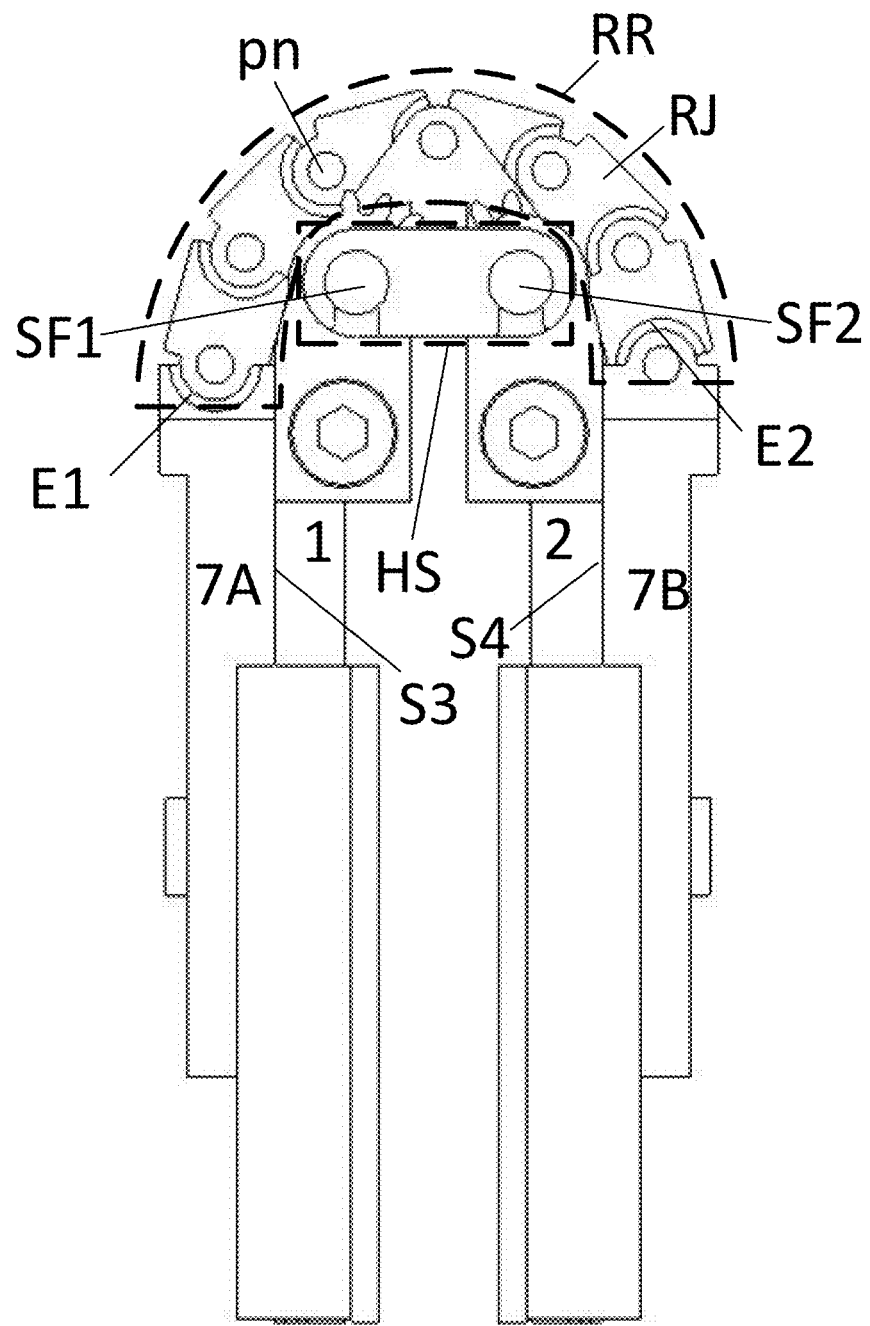
FIG. 2A is a side view of a pivotable module in some embodiments according to the present disclosure.
Figure 2B:
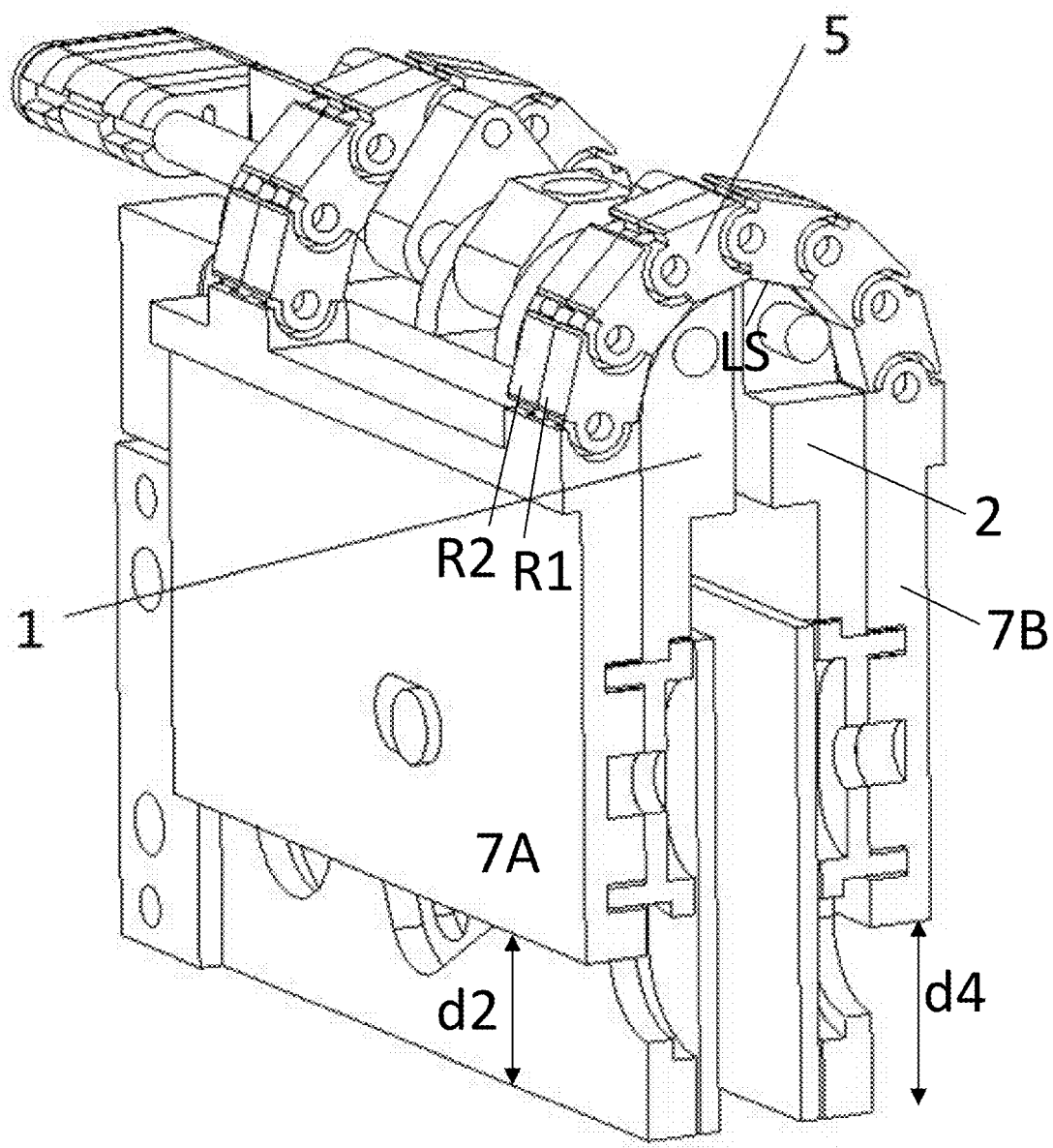
FIG. 2B is a perspective sectional view of a pivotable module in some embodiments according to the present disclosure.
Figure 2C:
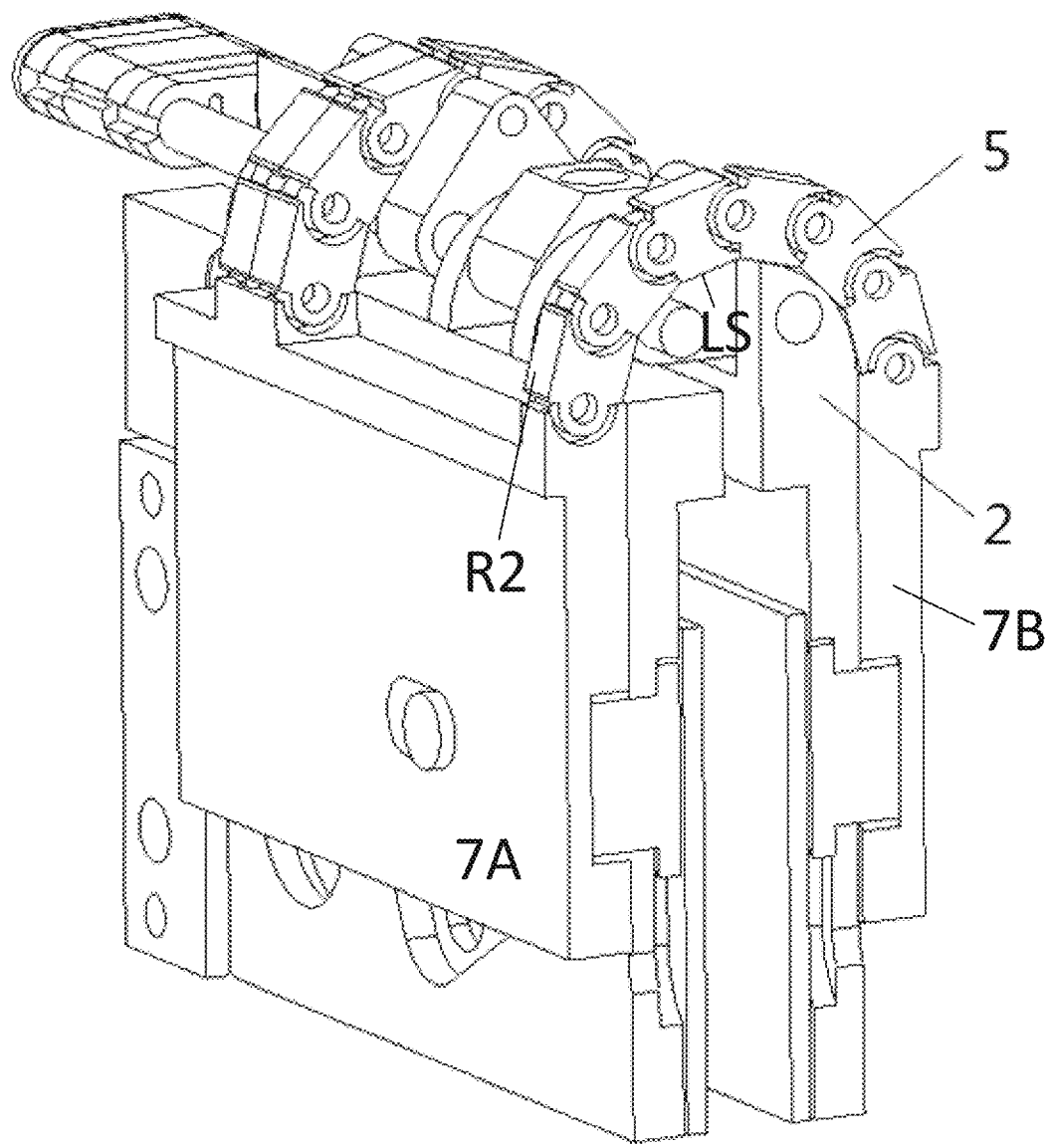
FIG. 2C is a perspective sectional view of a pivotable module in some embodiments according to the present disclosure.

FIG. 2A is a side view of a pivotable module in some embodiments according to the present disclosure. FIG. 2B is a perspective sectional view of a pivotable module in some embodiments according to the present disclosure. FIG. 2C is a perspective sectional view of a pivotable module in some embodiments according to the present disclosure. Referring to FIG. 24 to FIG. 2C, in a folded state of the pivotable support apparatus, the respective row RR of joints curves around the hinge structure HS. As shown in FIG. 2A, in one example, adjacent joists are connected using a pin pn.

Figure 3A:
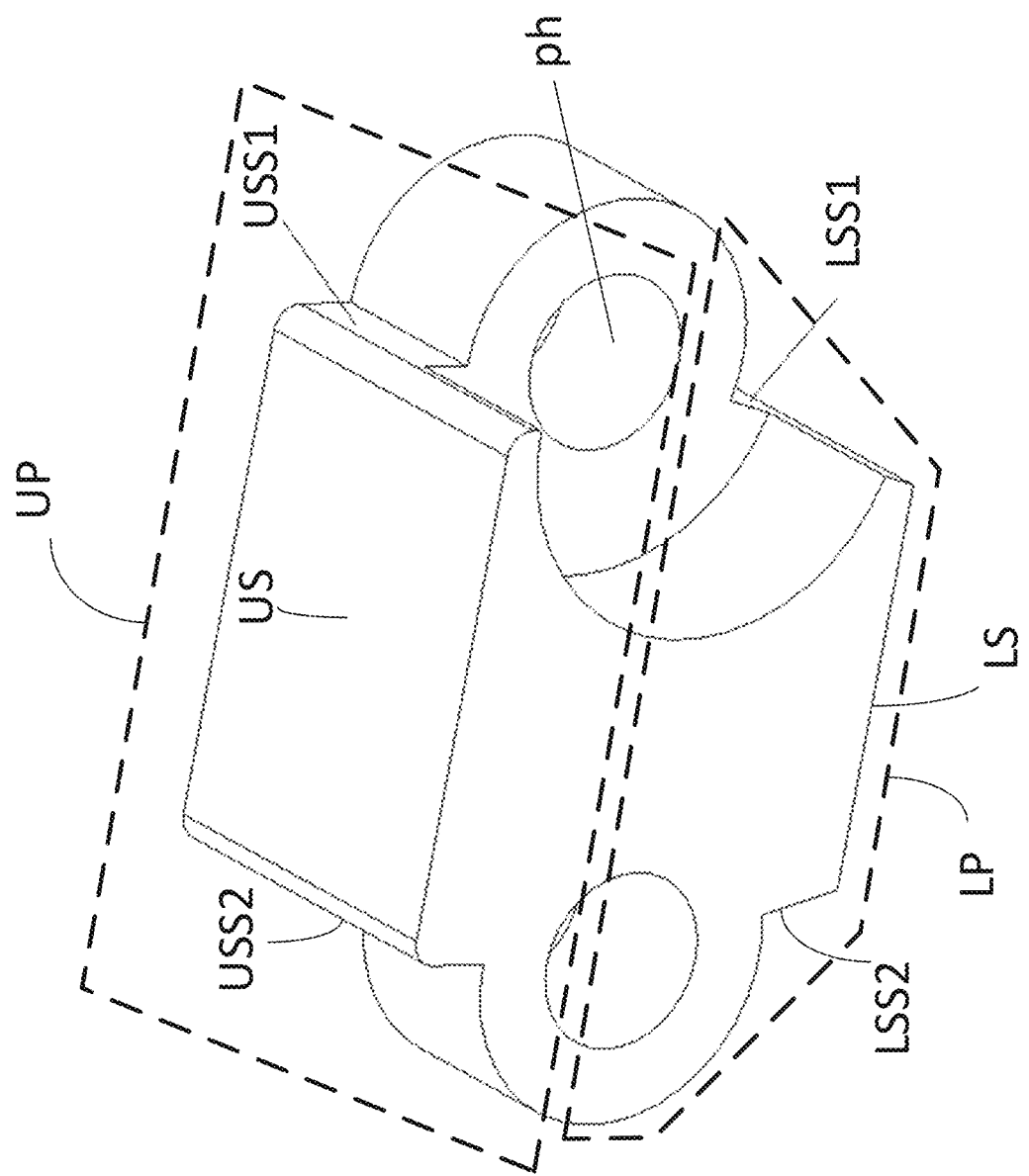
FIG. 3A is perspective view of a respective joint in some embodiments according to the present disclosure.

FIG. 3A is perspective view of a respective joint in some embodiments according to the present disclosure. Referring to FIG. 3A and FIG. 2A, the respective joint is some embodiments includes an upper portion UP and a lower portion LP, the upper portion UP being on a side of the lower portion LP away from the hinge structure HS. The upper portion includes an upper surface US, a first upper side surface USS1, and a second upper side surface USS2. Is one example, the respective joint further includes pin holes ph. Adjacent joints are connected using a pas (as depicted as pn in FIG. 2A), the pin extending through a first pin hole of a first adjacent joint and a second pin hole of a second adjacent joint.

Figure 3B:
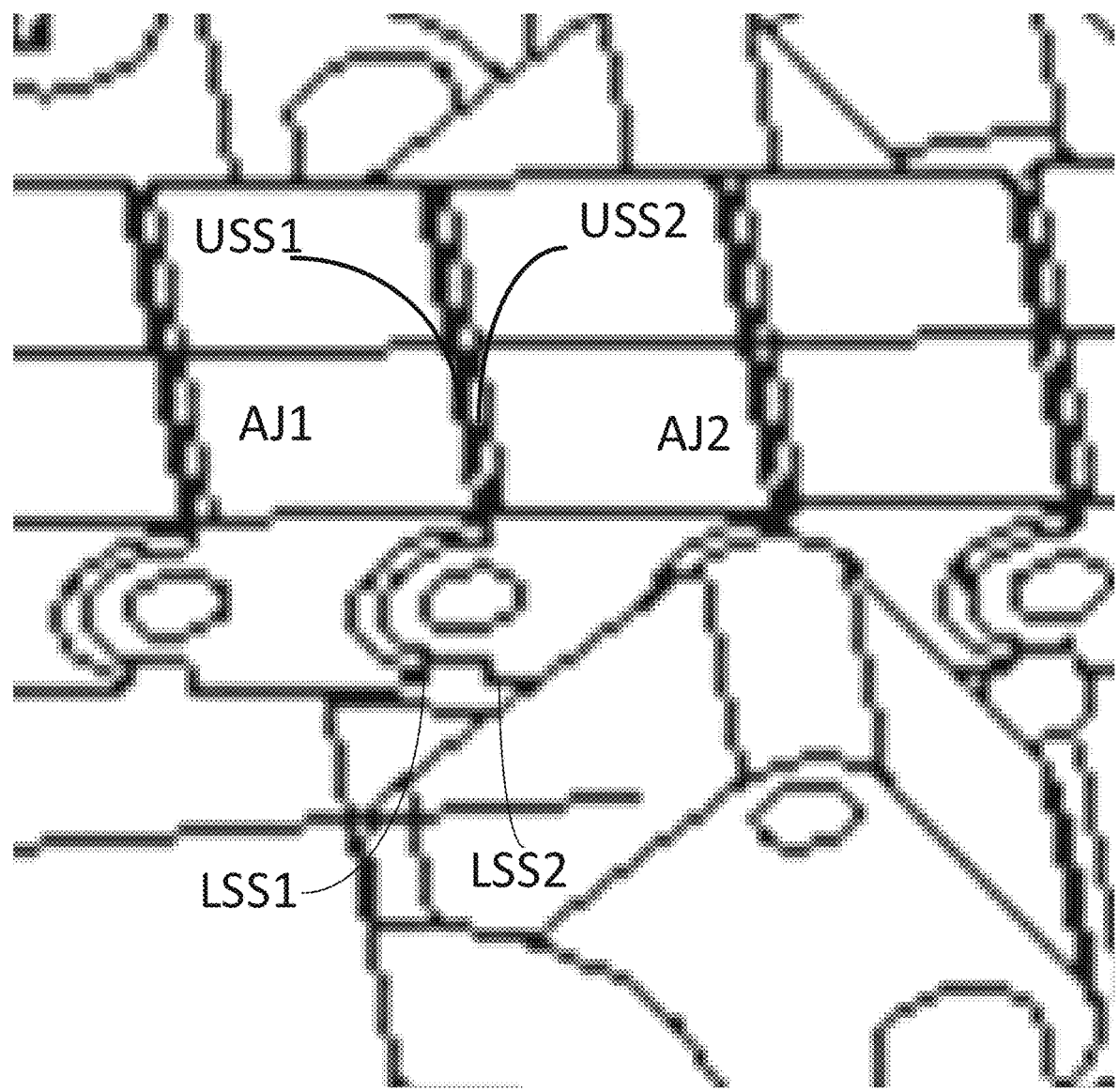
FIG. 3B illustrates a contact between adjacent joints in an unfolded state of a pivotable support apparatus in some embodiments according to the present disclosure.

FIG. 3B illustrates a contact between adjacent joints in an unfolded state of a pivotable support apparatus in some embodiments according to the present disclosure. Referring to FIG. 3B, contacts between respective first upper side surfaces (e.g., a respective one of which is denoted as USS1 in FIG. 3B) of respective upper portions of respective first adjacent joints (e.g., a respective one of which is denoted as AJ1 in FIG. 3B) and respective second upper side surfaces (e.g., a respective one of which is devoted as USS2 in FIG. 3B) of respective upper portion of respective second adjacent joints (e.g., a respective one of which is demoted as AJ2 in FIG. 3B) define a limit to which the pivotable support apparatus caw be unfolded. In an unfolded state of the pivotable support apparatus (e.g., as depicted in FIG. 1A and FIG. 1B), upper surfaces of upper portions of the plurality of joints are substantially co-planar, a respective first upper side surface USS1 of a respective upper portion of a respective first adjacent joint AJ1 is in contact with a respective second upper side surface USS2 of a respective upper portion of a respective second adjacent joint AJ2; and a respective first lower side surface LSS1 of a respective lower portion of the respective first adjacent joint AJ is spaced apart from a respective second lower side surface LSS2 of a respective lower portion of the respective second adjacent joint AJ2.

Figure 3C:
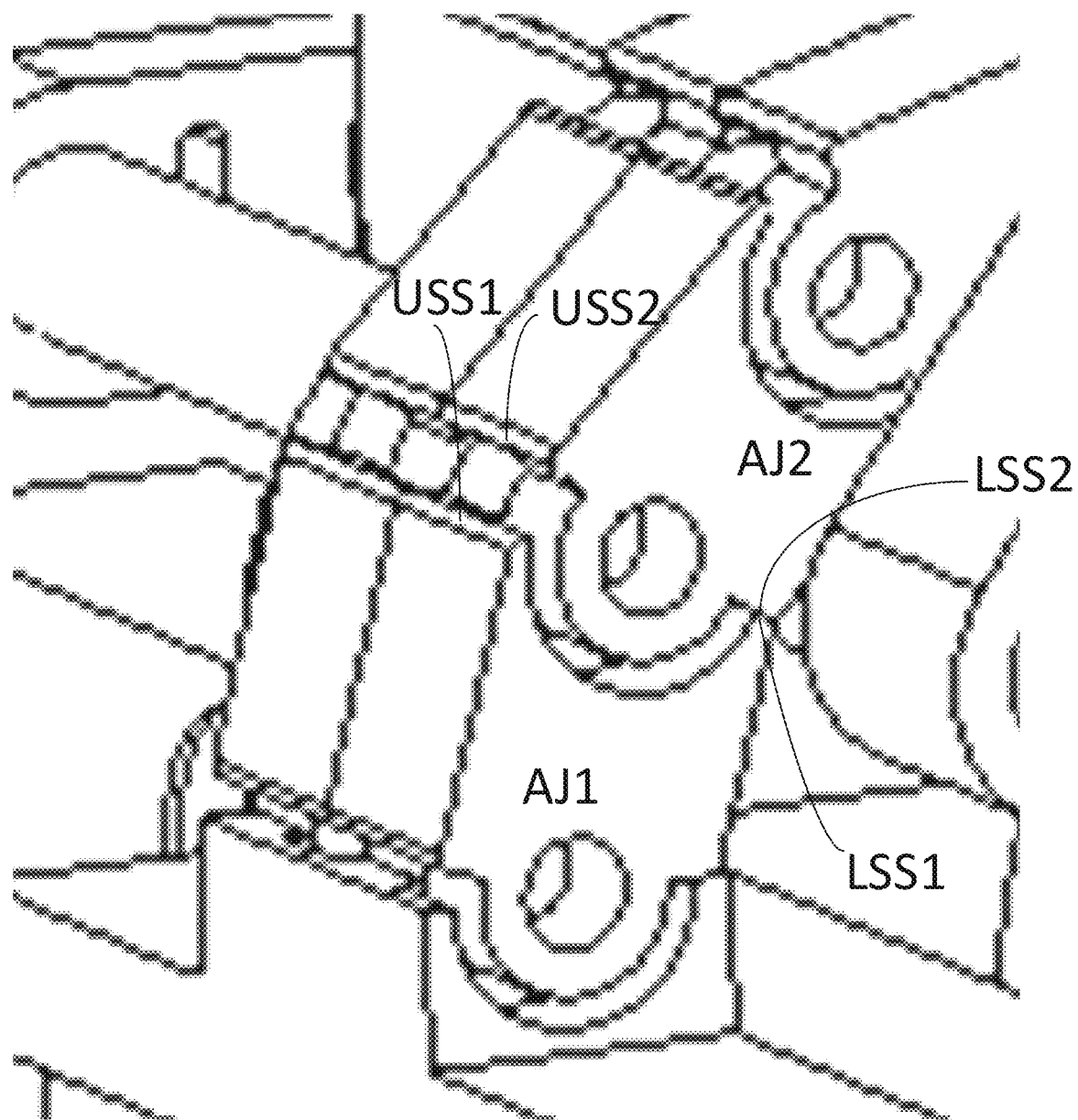
FIG. 3C illustrates a contact between adjacent joints in a folded state of a pivotable support apparatus in some embodiments according to the present disclosure.

Referring to FIG. 3A, the lower portion LP in some embodiments includes a lower surface LS, a first lower side surface LSS1, and a second lower side surface LSS2. FIG. 3C illustrates a contact between adjacent joints in a folded state of a pivotable support apparatus in some embodiments according to the present disclosure. Referring to FIG. 3C, contacts respectively between respective first lower side surfaces (e.g., a respective one of which is denoted as LSS1 in FIG. JA) of respective lower portions of respective first adjacent joints (e.g., a respective one of which is denoted as AJ1 is FIG. 3A) and respective second lower side surfaces (e.g., a respective one of which is denoted as LSS2 in FIG. 3A) of respective lower portions of respective second adjacent joints (e.g., a respective one of which is devoted as AJ2 in FIG. 3A) define a list to which the pivotable support apparatus can be folded. In the folded, state of the pivotable support apparatus (e.g., as depicted ix FIG. 2A to FIG. 20), upper surfaces of upper portions of the plurality of joints form portions of a curved surface; a respective first lower side surface LSS1 of a respective lower portion of a respective first adjacent joint AJ1 is in contact with a respective second lower side surface LSS2 of a respective lower portion of a respective second adjacent joint AJ2; and a respective first upper side surface USS1 of a respective upper portion of the respective first adjacent joist AJ1 is spaced apart from a respective second upper side surface USS2 of 3 respective upper portion of the respective second adjacent joint AJ2.

In the present pivotable support apparatus, the surface contact between adjacent joints defines an upper limit and a lower limit of a rotation with respect to the first rotational axis and the second rotational axis, the pivotable support apparatus cannot be inadvertently or advertently folded over the upper limit or over the lower list.

Referring to FIG. 1A, FIG. 1B, FIG. 2A to FIG. 2C, the pivotable support apparatus in some embodiments further includes a first rotating plate 1 and a second rotating plate 2. The fast shaft SF1 is configured to rotate as the first rotating plate 1 rotates, the second shaft SF2 is configured to rotate as the second rotating plate 2 rotates. Referring to FIG. 2A to FIG. 2C, in the folded state of the pivotable support apparatus, the first rotating plate 1 and the second rotating plate 2 are cooperatively configured to form a curved surface, the respective row of joists is configured to be at least partially supported by the curved surface.

Figure 4A:
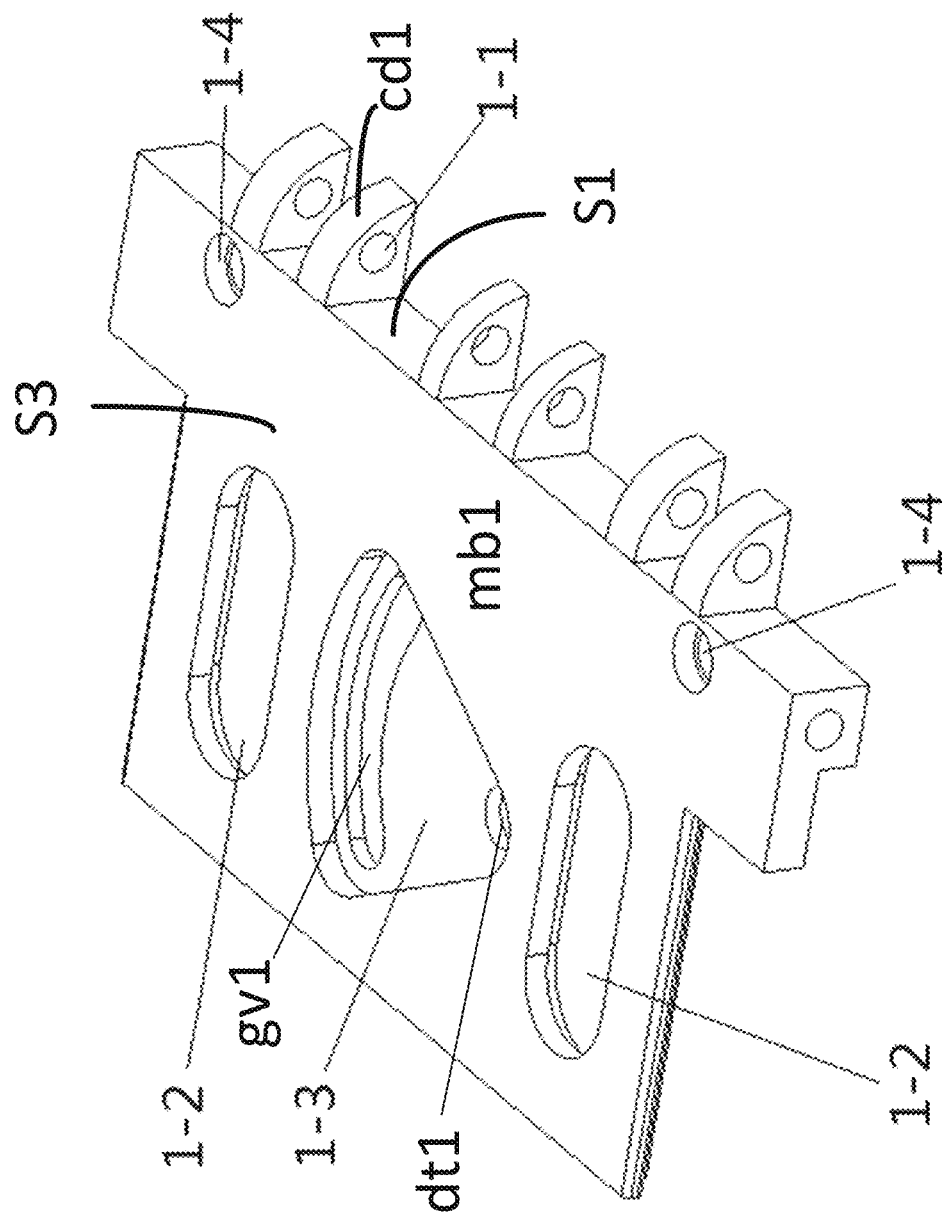
FIG. 4A is perspective view of a fast rotating plate in some embodiment's according to the present disclosure.

FIG. 4A is perspective view of a first rotating plate in some embodiments according to the present disclosure. FIG. 48 is perspective view of a second rotating plate in some embodiments according to the present disclosure. Referring to FIG. 4A, the first rotating plate 1 includes a first main body mb1 and a first connecting disc cd1 protruding from a first side surface S1 of the fast main body mb1. The first rotating plate 1 includes a first hole 1-1 extending through the first connecting disc cd1. Referring to FIG. 1A, FIG. 2A, ad FIG. 4A, the fast shaft SF1 extends through the first hole 1-1 to connect the first rotating plate 1 with the first shaft SF1.

Figure 4B:
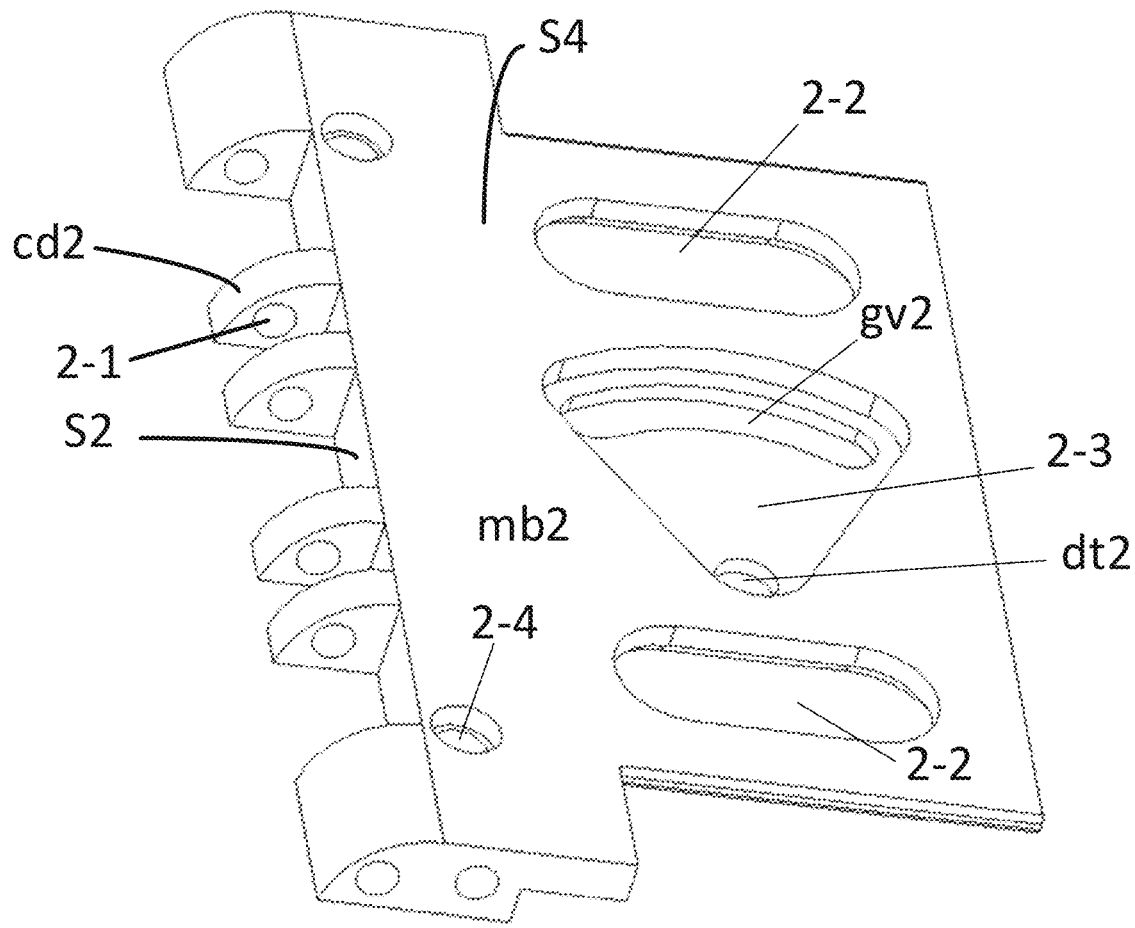
FIG. 4B is perspective view of a second rotating plate in some embodiments according to the present disclosure.

Referring to FIG. 4B, the second rotating plate 2 includes a second main body bm2 and a second connecting disc cd1 protruding from a second side surface S2 of the second main body mb2. Referring to FIG. 1A, FIG. 24, and FIG. 4B, the second rotating plate 2 includes a second hole 2-1 extending through the second connecting disc cd2, the second shaft SF2 extending through the second hole 2-1 to connect the second rotating plate 2 with the second shaft SF2.

FIG. 2B is a sessional view depicting a section showing a first row R1 of joints. The Est row R1 of joists are arranged with a second row R2 of joints side-by-side. Referring to FIG. 2B, in the folded state of the pivotable support apparatus, the first row R1 of joints is at least partially supported by the first connecting disc cd1. FIG. 2C is a sectional view depicting a section showing a second row R2 of joints. Referring to FIG. 2C, the second row R2 of joists is at least partially supported by the second connecting disc cd2.

In some embodiments, corresponding to two adjacent rows of joints arranged side-side (e.g., the first row R1 of joints and the second row R2 of joints depicted in FIG. 2B), the first connecting disc cd1 from the first rotating plate 1 and the second connecting disc cd2 from the second rotating plate 2 are arranged in a staggered fashion. As shown in FIG. 28, the first row R1 of joints includes six joints connected to each other. In the folded state of the pivotable support apparatus, three joints on the left side are supported by the first rotating plate 1 while another three joints on the right side are not supported by the second rotating plate 2 (nor by the fast rotating plate 1). The suspended three joints can still provide support for an object (e.g., a foldable display panel) disposed thereon, because the six joints in the first row R1 of joints are connected by pins. Referring to FIG. 2A, in the folded state of the pivotable support apparatus, lower surfaces (e.g., LS) of joints is the first row R1 of joints is not in contact with the second connecting disc cd2.

As shown in FIG. 2C, the second row R1 of joints includes six joints connected to each other. In the folded state of the pivotable support apparatus, three joints on the right side are supported by the second rotating plate 2 while another three joints on the left side are not supported by the first rotating plate 1 (nor by the second rotating plate 2). The suspended three joints can still provide support for an object (e.g., a foldable display panel) disposed thereon, because the six joints in the second row R2 of joints are connected by pins. Referring to FIG. 2A, lower surfaces (e.g., LS) of joints in the second row R2 of joints is not in contact with the first connecting disc cd1.

Figure 5A:
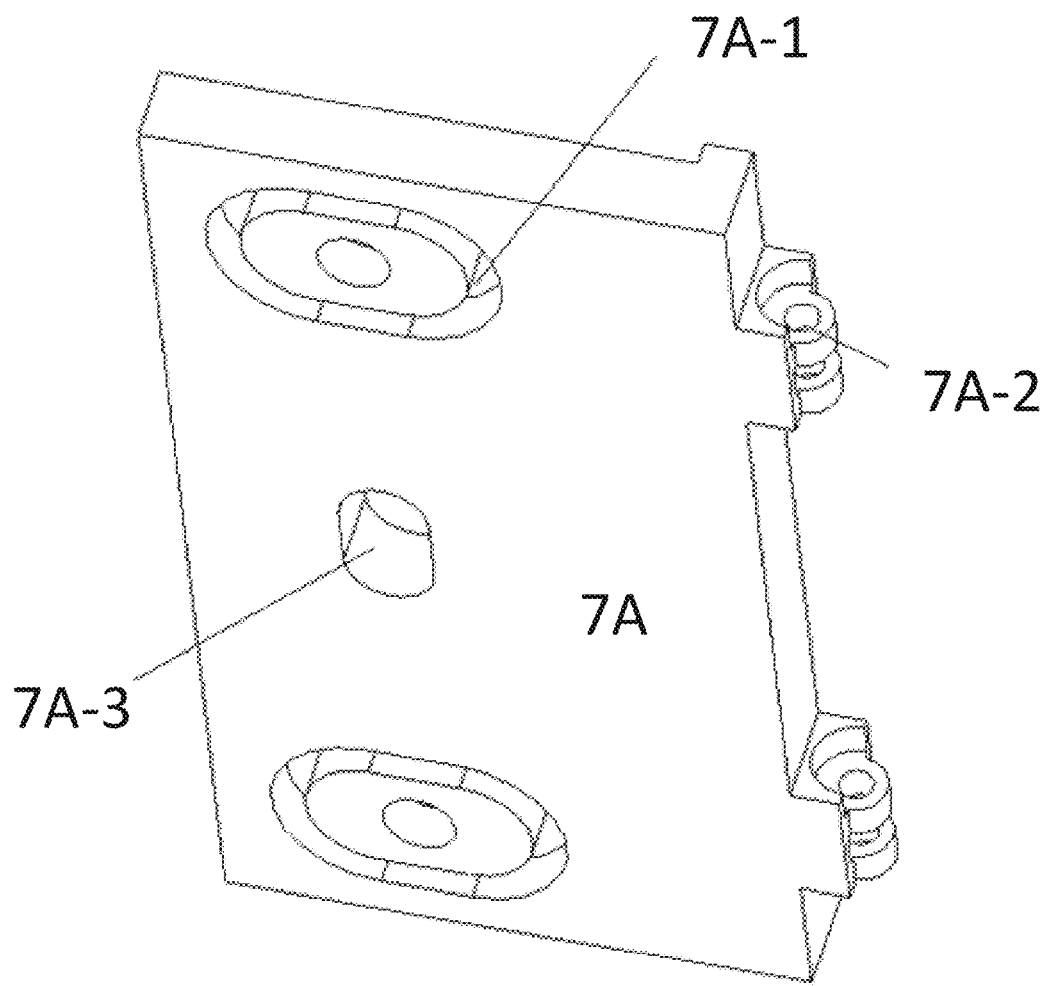
FIG. 5A is a perspective view of z first support plate in some embodiments according to the present disclosure.
Figure 5B:
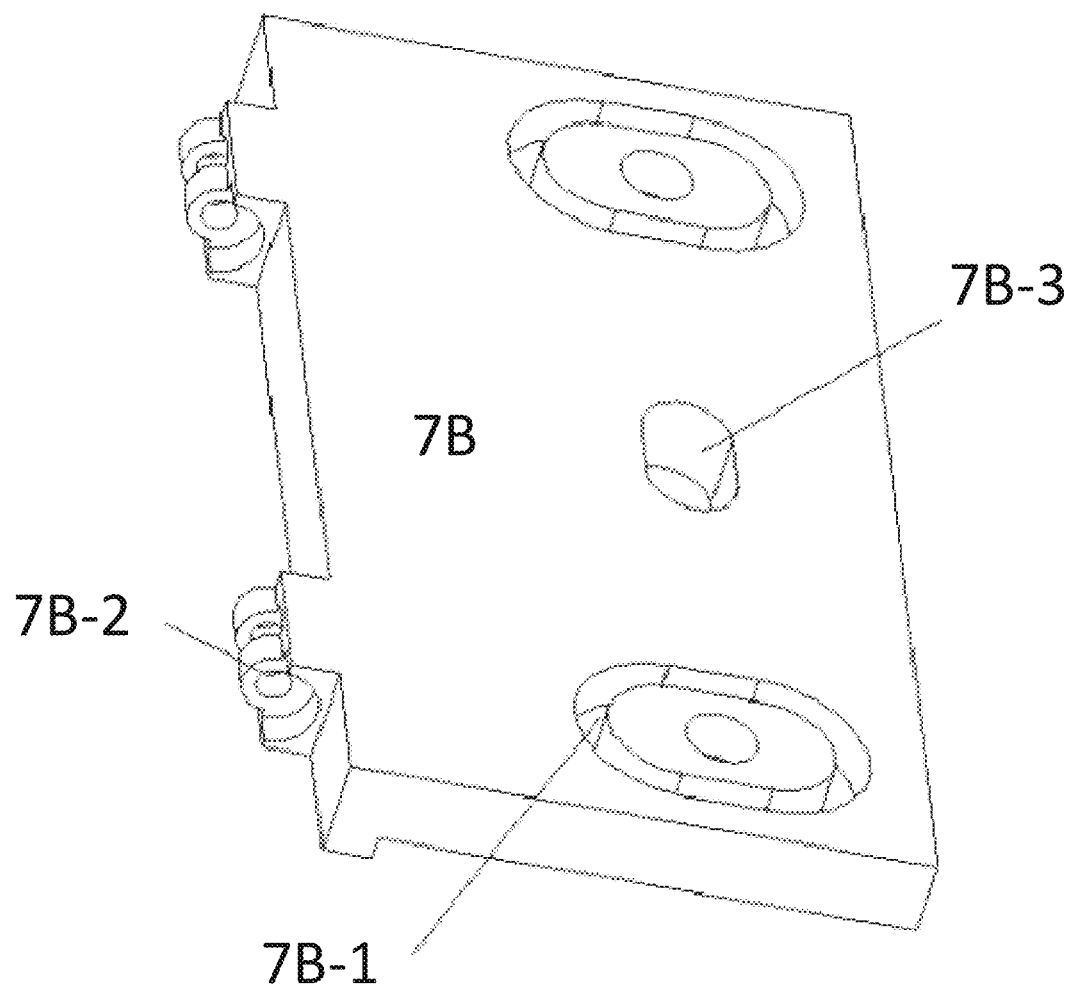
FIG. 5D is a perspective view of a second support plate in some embodiments according to the present disclosure.
FIG. 5 is perspective view of a triangular plate in some embodiments according to the present disclosure.

Is some embodiments, referring to FIG. 1A, the pivotable support apparatus father includes a first support plate 7A and a second support plate 7B. FIG. 5A is a perspective view of a first support plate in some embodiments according to the present disclosure. FIG. 5B is a perspective view of a second support plate is some embodiments according to the present disclosure. Referring to FIG. 1A, FIG. 5A, and FIG. 5B, the first shaft SF1 is configured to rotate as the first support plate 7A and the fast rotating plate 1 rotate, the second shaft SF2 is configured to rotate as the second support plate 7B and the second rotating plate 2 rotate. Referring to FIG. 2A, two opposite ends (E1 and E2) of the respective row RR of joints are respectively attached to the first support plate 74 and the second support plate 7B, e.g., respectively through pins.

Referring to FIG. 4A, the first main body mb1 in some embodiments father includes a third side surface S3 connected to the first side surface S1. Referring to FIG. 2A, the thud side surface S3 at least partially supporting the first support plate 7A.

Referring to FIG. 4B, the second main body mb2 in some embodiments further includes a fourth side surface S4 connected to the second side surface S2. Referring to FIG. 2A, the fourth side surface at least partially supporting the second support plate 7B.

In some embodiments, the first rotating plate 1 and the first support plate 74 are configured to move relative to each other as the first rotating plate 1 rotates about the first rotational axis AX1, and the second rotating plate 2 and the second support plate 7B are configured to move relative to each other as the second rotating plate 2 rotates about the second rotational axis AX2. As depicted in FIG. 2B, in the folded state of the pivotable support apparatus, edges of the first rotating plate 1 and the first support plate 7A are spaced apart relative to each other by a distance d2. As depicted in FIG. 1A, in the unfolded state of the pivotable support apparatus, edges of the first rotating plate 1 and the first support plate 7A are spaced apart relative to each other by a distance d1. Optionally, d1 is less than d2. As depicted in FIG. 2B, in the folded state of the pivotable support apparatus, edges of the second rotating plate 2 and the second support plate 7B are spaced apart relative to each other by a distance d4. As depicted in FIG. 1A, in the unfolded state of the pivotable support apparatus, edges of the second rotating plate 2 and the second support plate 7B are spaced apart relative to each other by a distance d3. Optionally, d3 is less than d4.

In some embodiment, an area of the first rotating plate 1 uncovered by the first support plate 7A whew the pivotable support apparatus is in the folded state is greater than an area of the first rotating plate 1 uncovered by the first support plate 7A when the pivotable support apparatus is in the unfolded state; and as area of the second rotating plate 2 uncovered by the second support plate 78 when the pivotable support apparatus is in the folded state is greater than an area of the second rotating plate 2 uncovered by the second support plate 78 when the pivotable support apparatus is in the unfolded state.

In some embodiments, the first support plate 7A is mounted onto the first rotating plate 1, and the second support plate 7B is mounted onto the second rotating plate 2. Referring to FIG. 1B, the pivotable support apparatus in some embodiments further includes a first mount 25A for mounting the first support plate 7A onto the first rotating plate 1, and a second mount 25B for mounting the second support plate 7B onto the second rotating plate 2.

Referring to FIG. 4A, the first rotating plate 1 includes a first slot 1-2. Referring to FIG. 5A, the first support plate 7A includes a second slot 7A-1. Referring to FIG. 1B, FIG. 4A, and FIG. 5A, the first mount 25A extends through the first slot 1-2 and at least partially into the second slot 7A-1, thereby mounting the first support plate 7A onto the first rotating plate 1. The first slot 1-2 and the second slot 7A-1 limit a movement of the first mount 25A in a space provided by the first slot 1-2 and the second slot 7A-1. In are example as shown in FIG. 1B, the space provided by the first slot 1-2 and the second slot 7A-1 has an elongated shape, a longitudinal direction of the elongated shape is along a direction crossing over (e.g., perpendicular to) the first shaft SF1 and the second shaft SF2, substantially limiting the movement of the first mount 25A to the longitudinal direction.

Figure 7A:
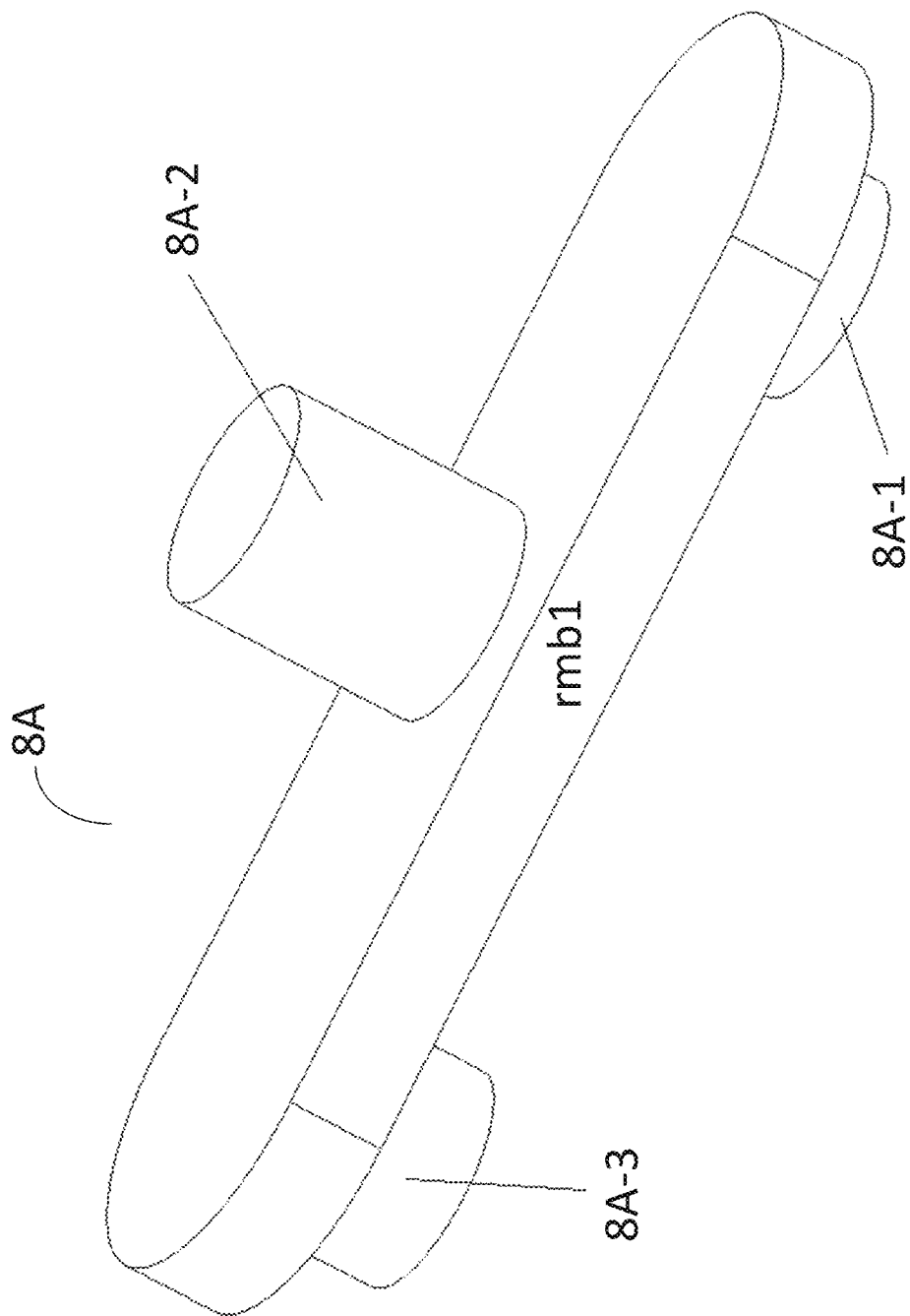
FIG. 7A is a perspective view of a first rotating rod in some embodiments according to the present disclosure.
Figure 7B:
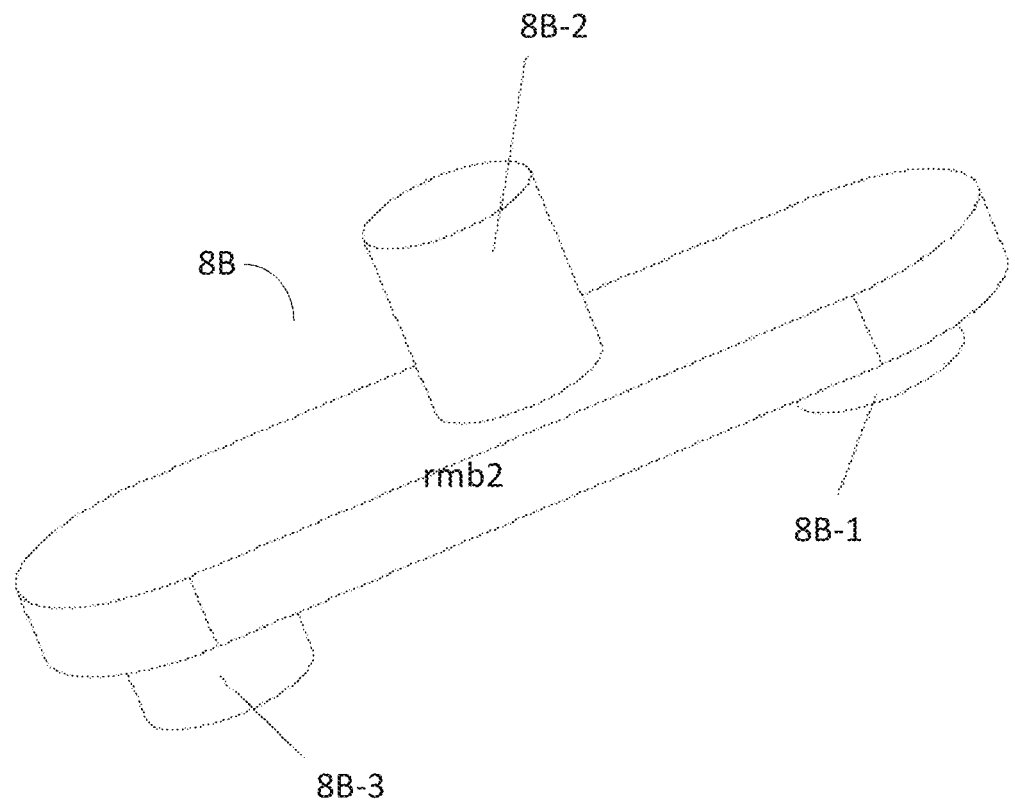
FIG. 7B is a perspective view of a second rotating rod in some embodiments according to the present disclosure.
Figure 8:
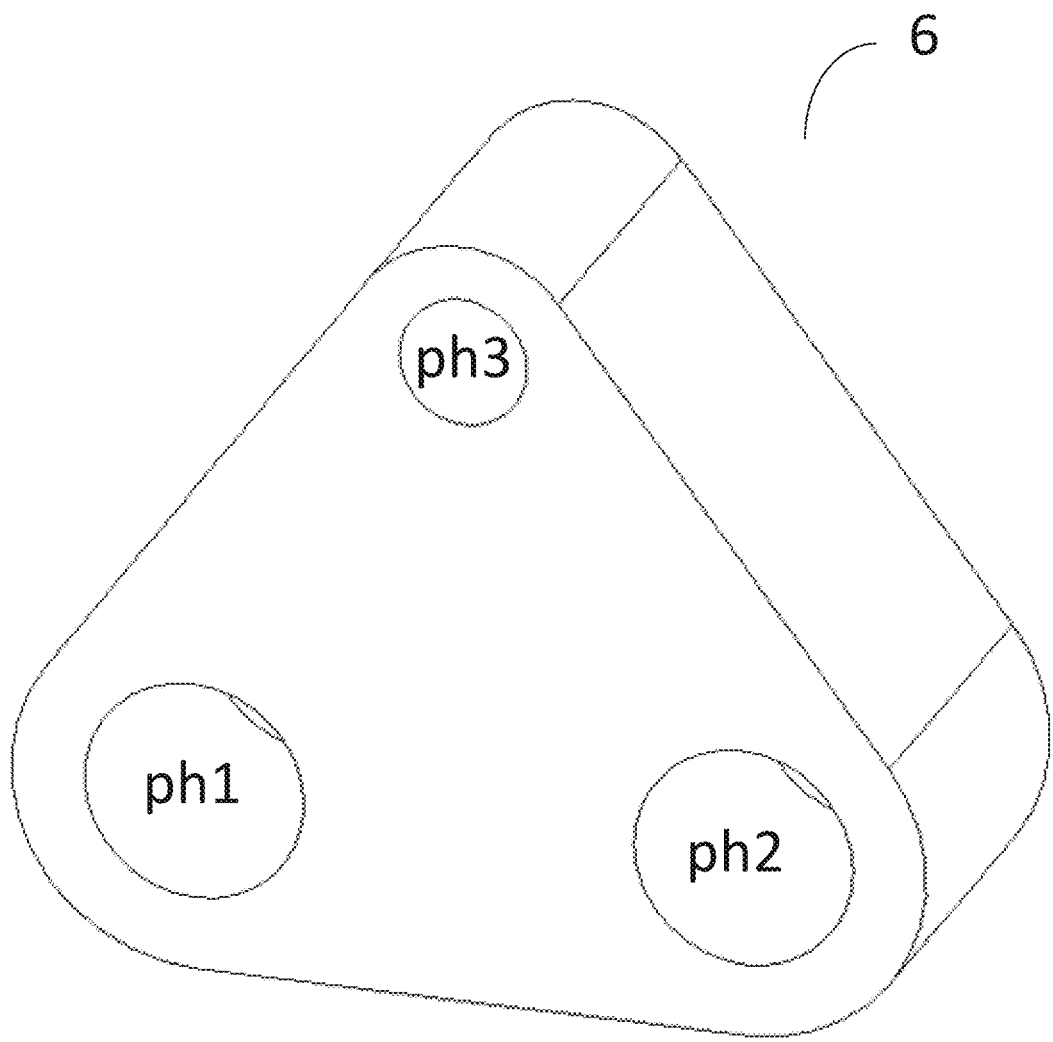

The first support plate 74 further includes a third hole 74-2. The second support plate 7B further includes a fourth hole 75-2. Referring to FIG. 1A, FIG. 2A, and FIG. 7A, a first end E1 of the respective row RR of joints is connected to the first support plate 7A through a pin that extends through the third sole 7A-2. Referring to FIG. 1A, FIG. 2A, and FIG. 7B, a second end E2 of the respective row RR of joints is connected to the second support plate 7B through a pin that extends through the fourth bale 78-2.

Referring to FIG. 4B, the second rotating plate 2 includes a third slot 2-2. Referring to 5B, the second support plate 7B includes a fourth slot 7B-1. Referring to FIG. 1B, FIG. 4B, and FIG. 55, the second mount 25B extends through the third slot 2-2 and at least partially into the fourth slot 7B-1, thereby mounting the second support plate 75 onto the second rotating plate 2. The third slot 2-2 and the fourth slot 7B-1 limit a movement of the second mount 25B in a space provided by the third slot 2-2 and the fourth slot 7B-1. In one example as shown in FIG. 1B, she space provided by the third slot 2-2 and the fourth slot 7B-1 has an elongated shape, a longitudinal direction of the elongated shape is along a direction crossing over (e.g., perpendicular to) the first shaft SF1 and the second shaft SF2, substantially limiting the movement of the second mount 25B to the longitudinal direction.

Figure 6A:
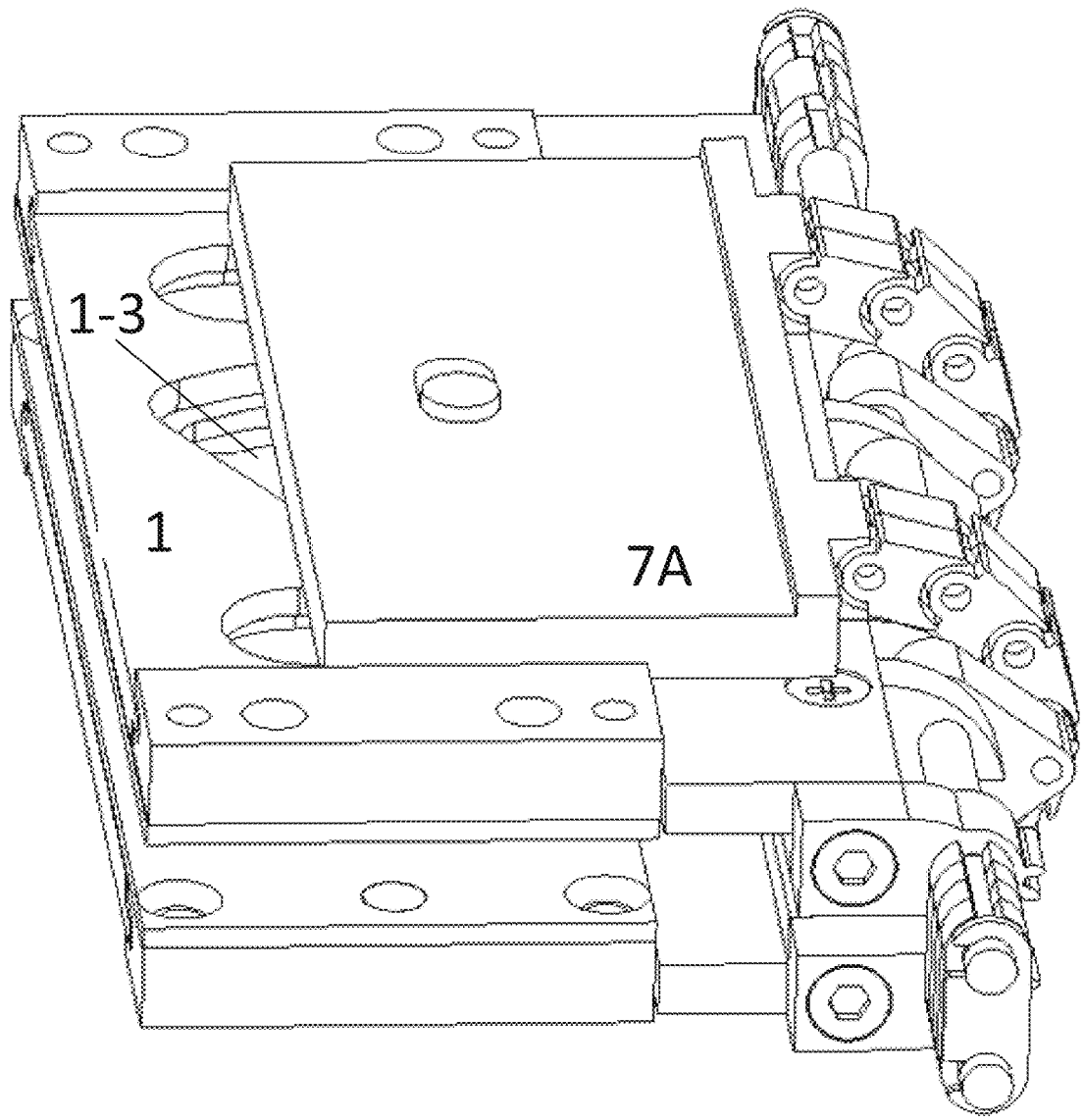
FIG. 6A and FIG. 6B illustrate a sliding mechanisms in some embodiments according to the present disclosure.
Figure 6B:
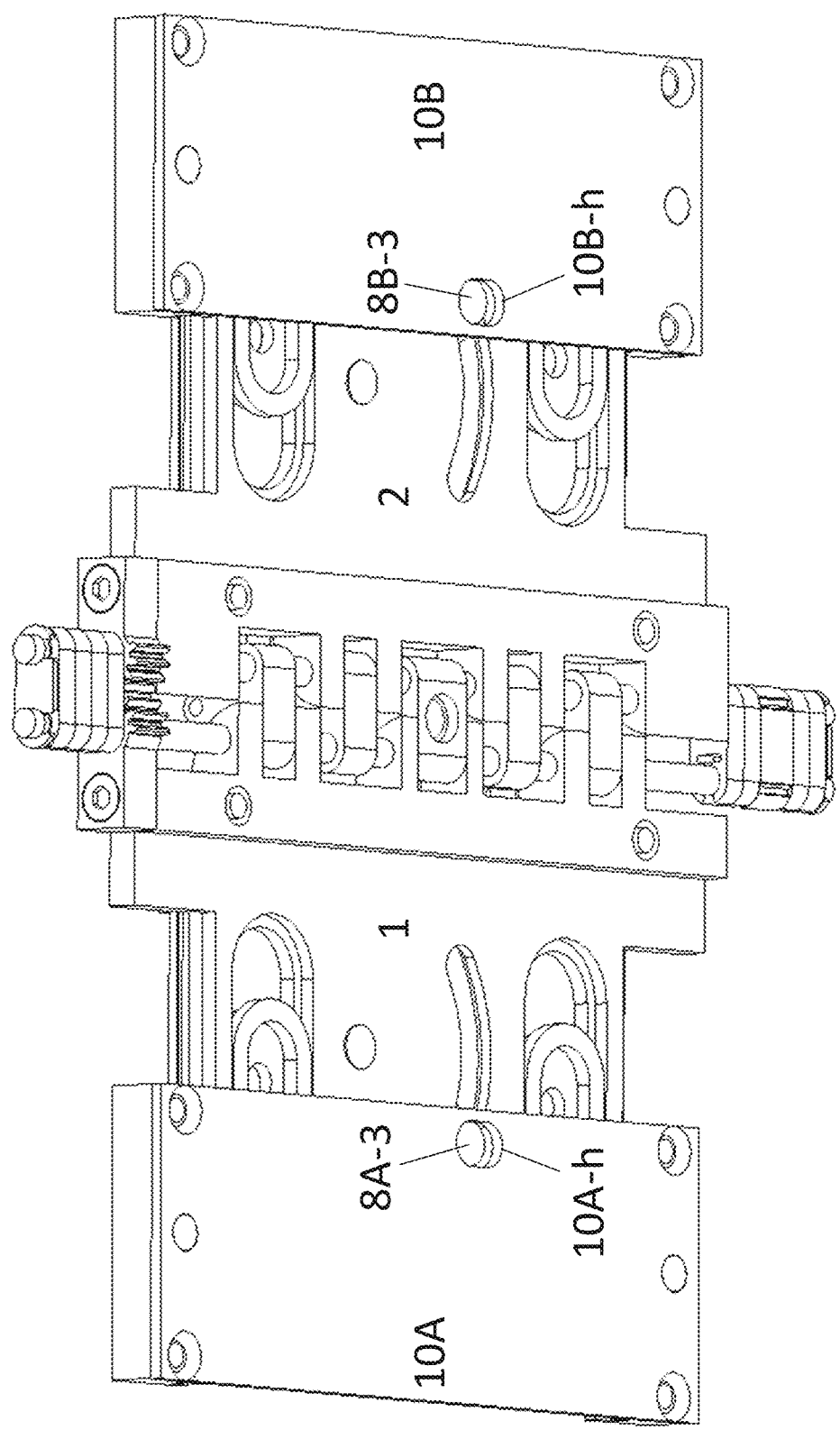

FIG. 6A and FIG. 6B illustrate a sliding mechanism in some embodiments according to the present disclosure. Referring to FIG. 1B and FIG. 6B, the pivotable support apparatus father comprises a first sliding plate 10A mounted onto the first rotating plate 1 and a second siding plate 108 mounted onto the second rotating plate 2.

In some embodiments, referring to FIG. 1A and FIG. 1B, the pivotable support apparatus further includes a fast rotating rod SA for mounting the first sliding plate 10A onto the first rotating plate 1, and a second rotating rod 8B for mounting the second sliding plate 108 onto the second rotating plate 2.

FIG. 7A is a perspective view of a first rotating rod in some embodiments according to the present disclosure. Referring to FIG. 7A, the first rotating rod SA includes a first rod main body mb1, a first limiting post 8A-L, a second limiting post 8A-2, and a third limiting post 8A-3. The second limiting post 8A-2 protrudes from a side of the first rod main body rmb1 opposite to a side from which the first limiting post 8A-1 and the third limiting post 8A-3 protrude. Referring to FIG. 4A, FIG. 7A, and FIG. 6A, the first rotating plate 1 includes a first receiving slot 1-3 configured to receive at least the first rod main body rmb1.

FIG. 7B is a perspective view of a second rotating rod is some embodiments according to the present disclosure. Referring to FIG. 78, the second rotating rod 8B includes a second rod main body rmb2, a fourth limiting post 8B-1, a fifth limiting post 8B-2, and a sixth limiting post 8B-3. The fifth limiting post 8B-2 protrudes how a side of the second rod main body rmb2 opposite to a side from which the fourth limiting post 8B-1 and the sixth limiting post 8B-3 protrude. Referring to FIG. 4B and FIG. 7B, the second rotating plate 2 includes a second receiving slot 2-3 configured to receive at least the second rod main body rmb2.

Referring to FIG. 4A, the first rotating plate is some embodiments further includes a first dent dt1, inside a region of the first receiving slot 1-3. Referring to FIG. 4A and FIG. 7A, the first dent dt1 is configured to receive the first limiting post 8A-1. The first limiting post 8A-1 extends at least partially into the first dent de1, thereby connecting the first limiting post 8A-1 to the first rotating plate 1.

Referring to FIG. 4B, the second rotating plate in some embodiments further includes a second dent dt2 inside a region of the second receiving slot 2-3. Referring to FIG. 4B and FIG. 7B, the second dent dt2 is configured to receive the fourth limiting post 8B-1. The fourth limiting post 8B-1 extends at least partially into the second dent dt2, thereby connecting the fourth limiting post 8B-1 to the second rotating plate 2.

Referring to FIG. 5A and FIG. 7A, the first support plate 7A in some embodiments includes a first post hole 7A-3 configured to receive the second limiting post 8A-2, the second limiting post 8A-2 extends at least partially into the first post hole 7A-3 thereby connecting the second limiting post 8A-2 to the first support plate 7A.

Referring to FIG. 5B and FIG. 7B, the second support plate 78 in some embodiments includes a second post hole 78-3 configured to receive the fifth limiting post 8B-2, the fifth limiting post 8B-2 extends at least partially into the second post hole 7B-3 thereby connecting the fifth limiting post 8B-2 to the second support plate 7B.

Referring to FIG. 6B and FIG. 7A, the first sliding plate 104 in some embodiments includes a third post hole 10A-h configured to receive the third limiting post 8A-3. Referring to FIG. 4A, the first rotating plate 1 in some embodiments further includes a first groove gv1 inside a region of the first receiving slot 1-3. Optionally, the first groove gv1 has a curved trajectory. Referring to FIG. 6B and FIG. 74, the third limiting post 8A-3 extends through the first groove gel and at least partially into the third post hole 10A-h. The first groove gv1 is configured to allow movement of the third limiting post 8A-3 in a space provided by the first groove gv1.

Referring to FIG. 6B and FIG. 7B, the second sliding plate 10B in some embodiments includes a fourth post hole 10B-h configured to receive the sixth limiting post 88-3. Referring to FIG. 4B, the second rotating plate 2 in some embodiments further includes a second groove gv2 inside a regions of the second receiving slot 2-3. Optionally, the second groove gv2 has a curved trajectory. Referring to FIG. 6B and FIG. 7B, the sixth limiting post 8B-3 extends through the second groove gv1 and at least partially into the fourth post hole 10B-h. The second groove gv2 is configured to allow movement of the sixth limiting post 88-3 in a space provided by the second groove gv2.

Referring to FIG. 1A, in some embodiments, the first sliding plate 10A includes a first side portion 9A and a second side portion 9B. The first side portion 9A includes a first sliding groove sgv1, the second side portion 9B includes a second sliding groove sgv2. The first sliding groove sgv1 and the second sliding groove sgv2 face each other. The first sliding groove sgv1 and the second sliding groove sgv2 are configured to respectively receive two portions of the first rotating plate 1, allowing the first rotating plate 1 to move relatively to the first sliding plate 10A.

Referring to FIG. 1A, in some embodiments, the second sliding plate 10B includes a third side portion 9C and a fourth side portion 9D. The third side portion 9C includes a third sliding groove sgv3, the fourth side portion 9D includes a fourth sliding groove sgv4. The third sliding groove sgv3 and the fourth sliding groove sgv4 face each other. The third sliding groove sgv3 and the fourth sliding groove sgv4 are configured to respectively receive two portions of the second rotating plate 2, allowing the second rotating plate 2 to move relatively to the second sliding plate 100.

In the present pivotable support apparatus, the first rotating rod &A and the second rotating rod &D function to amplify the sliding movement of the first support plate 7A and the second support plate 7B, respectively. The amplified sliding movement is then transferred to the first sliding plate 10A and the second sliding plate 10B, respectively. In turn, the amplified sliding movement is transferred to a frame of the present pivotable support apparatus, the fame connected to the first sliding plate 10A and the second sliding plate 10B. The degree of amplification of the siding movement can be changed by adjusting the first rotating rod SA and the second rotating rod 8B.

In some embodiments, the pivotable support apparatus further includes a triangular plate. FIG. 2 is perspective view of a triangular plate is some embodiments according to the present disclosure. Referring to FIG. 1A and FIG. 5, the triangular plate 6 includes a first plate hole ph1, a second plate hole ph2, and a thud plate hole ph3. The first shaft SF1 extends through the first plate hole ph1. The second shaft SF2 extends through the second plate bole ph2. A pin connecting two adjacent joints of the plurality of joints 5 extends through the third plate hole ph3, ensuring the respective row ER of joints folds symmetrically.

Figure 9:
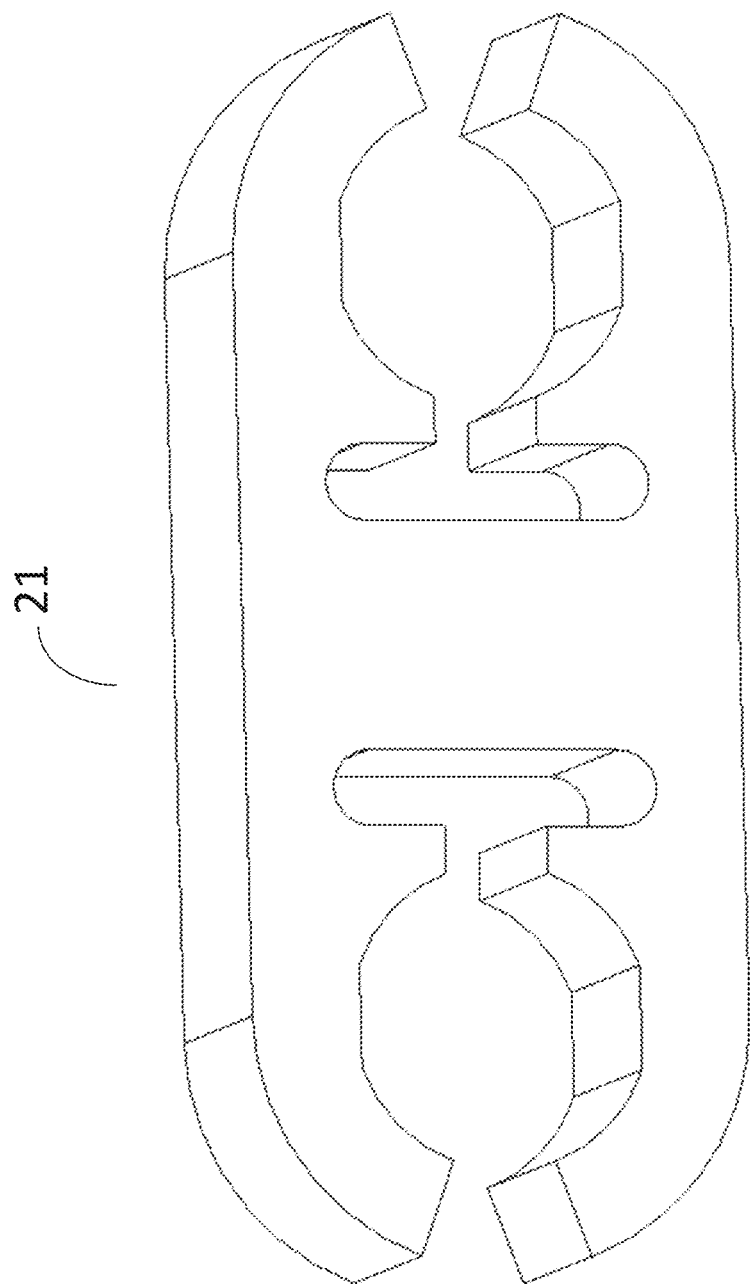
FIG. 9 is a perspective view of a torque plate in some embodiments according to the present disclosure.

In some embodiments, the pivotable support apparatus further includes a torque plate. FIG. 9 is a perspective view of a torque plate is some embodiments according to the present disclosure. Referring to FIG. 1A and FIG. 9, in some embodiments, the torque plate 21 is configured to be overfitted with the first shaft SF1 and the second shaft SF2, thereby damping a rotation of the pivotable support apparatus.

Figure 10A:
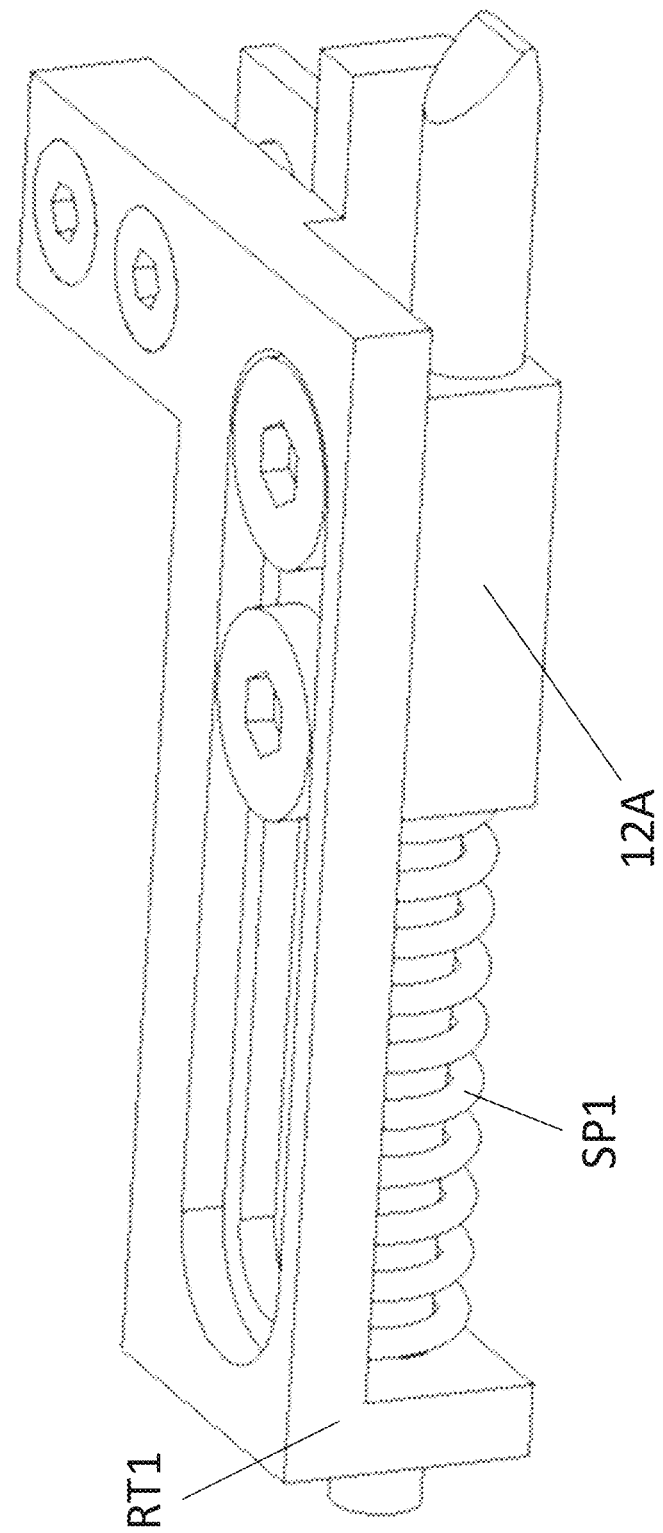
FIGS. 10A and 10B are perspective views of an auto-lock device comprising a cam bar in some embodiments according to the present disclosure.
Figure 10B:
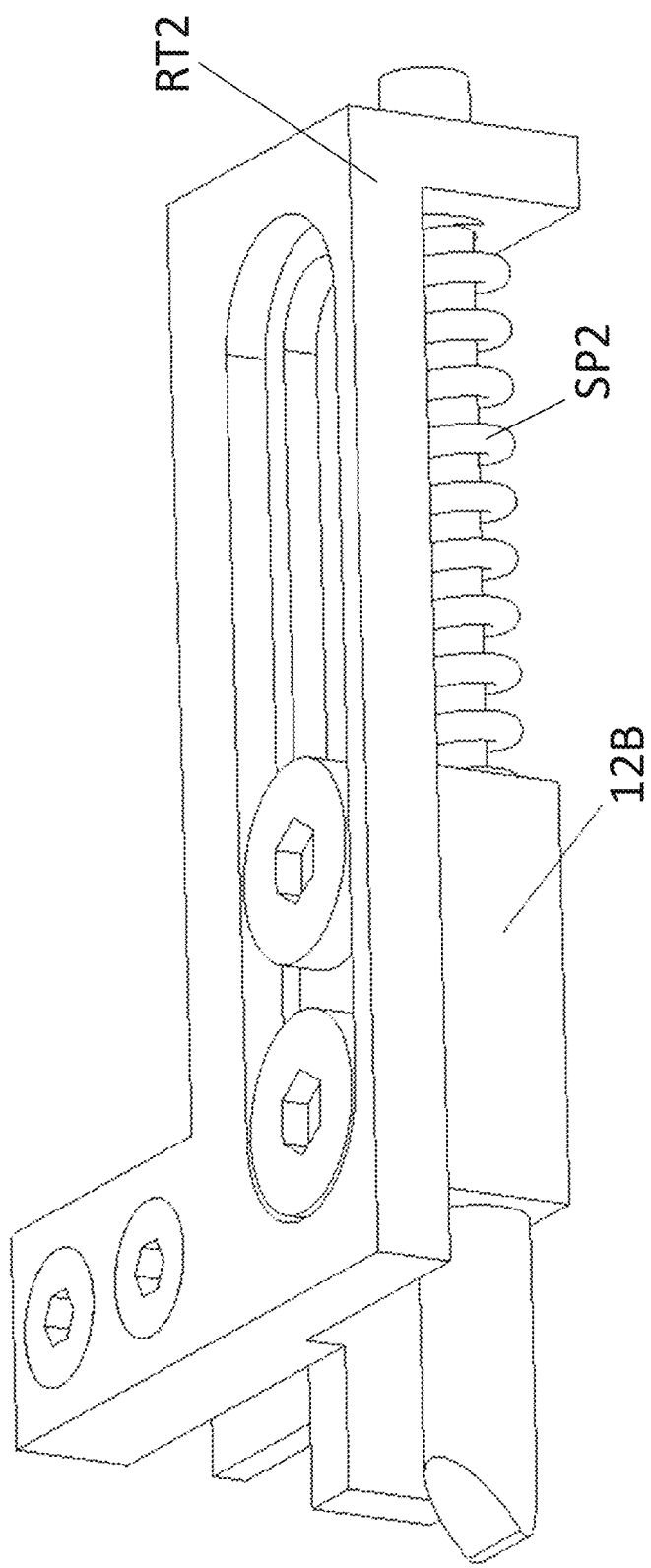
Figure 11:
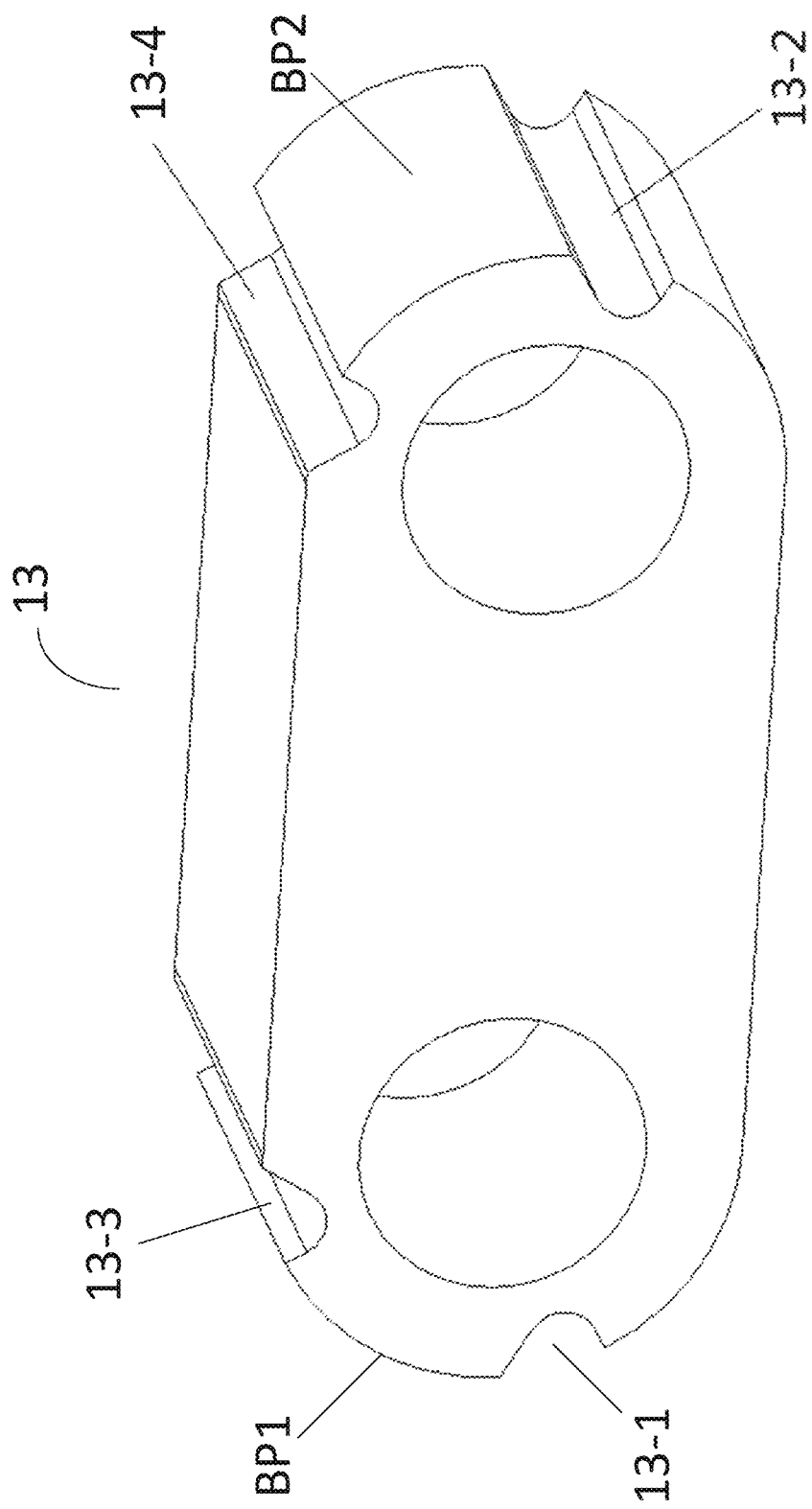
FIG. 11 is a perspective new of a cam in some embodiments according to the present disclosure.

In some embodiment, the pivotable support apparatus further includes an auto-lock device. FIGS. 10A and 10B are perspective views of an auto-lock device comprising a cam bar in some embodiments according to the present disclosure. FIG. 11 is a perspective view of a cam in some embodiments according to the present disclosure. Referring to FIG. 1A, FIGS. 10A to 10B, and FIG. 11, the pivotable support apparatus in some embodiments further includes a fast cam bar 12A; a second cam bar 12B; and a cam 13 having a first notch 13-1, a second notch 13-2, a third notch 13-3, and a fourth notch 13-4. In an unfolded state of the pivotable support apparatus, the first cam bar 124 is configured to be engaged with the first notch 13-1, and the second cam bar 12B is configured to be engaged with the second notch 13-2, thereby locking the pivotable support apparatus at a position defined by the engagement between the first cam bar 12A and the first notch 13-1, and the engagement between the second cam bar 12B and the second notch 13-2.

In the folded state of the pivotable support apparatus, the first cam bar 12A is configured to be engaged with the third notch 13-3, and the second cam bar 12B is configured to be engaged with the fourth notch 13-4, thereby locking the pivotable support apparatus at a position defined by the engagement between the first cam bar 12A and the third watch 13-3, and the engagement between the second cam bar 12B and the fourth notch 13-4.

In some embodiments, the pivotable support apparatus farther includes a first cam bar retainer RT1 including a first spring SP1, and a second cam bar retainer RT2 including a second spring SP2. The first spring SP1 is configured to apply a force to the first cam bar 124 to maintain the first cam bar 12A is contact with the can 13. The second spring SP2 is configured to apply a force to the second cam bar 12B to maintain the second cam bar 12B in contact with the cam 13. Optionally, the first spring SP1 is configured to apply the force when the pivotable support apparatus is in the folded state, or in the unfolded state, or at any position during a movement between the folded state and the unfolded state. Optionally, the second spring SP2 is configured to apply the force when the pivotable support apparatus is in the folded state, or in the unfolded state, or at any position during a movement between the folded state and the unfolded state.

In some embodiments, de cam 13 includes a first bump BP1 positioned between the first notch 13-1 and the third notch 13-3, and a second bump BP2 positioned between the second notch 13-2 and the fourth notch 13-4. In the present pivotable support apparatus, during a movement between the folded state and the unfolded state of the pivotable support apparatus, first fast cam bar 12A is in contact with and gliding on a surface of the first bump BP1, the second cam bar 12-B is in contact with and gliding on a surface of the second bump BP2, thereby damping the movement of the pivotable support apparatus.

Figure 12:
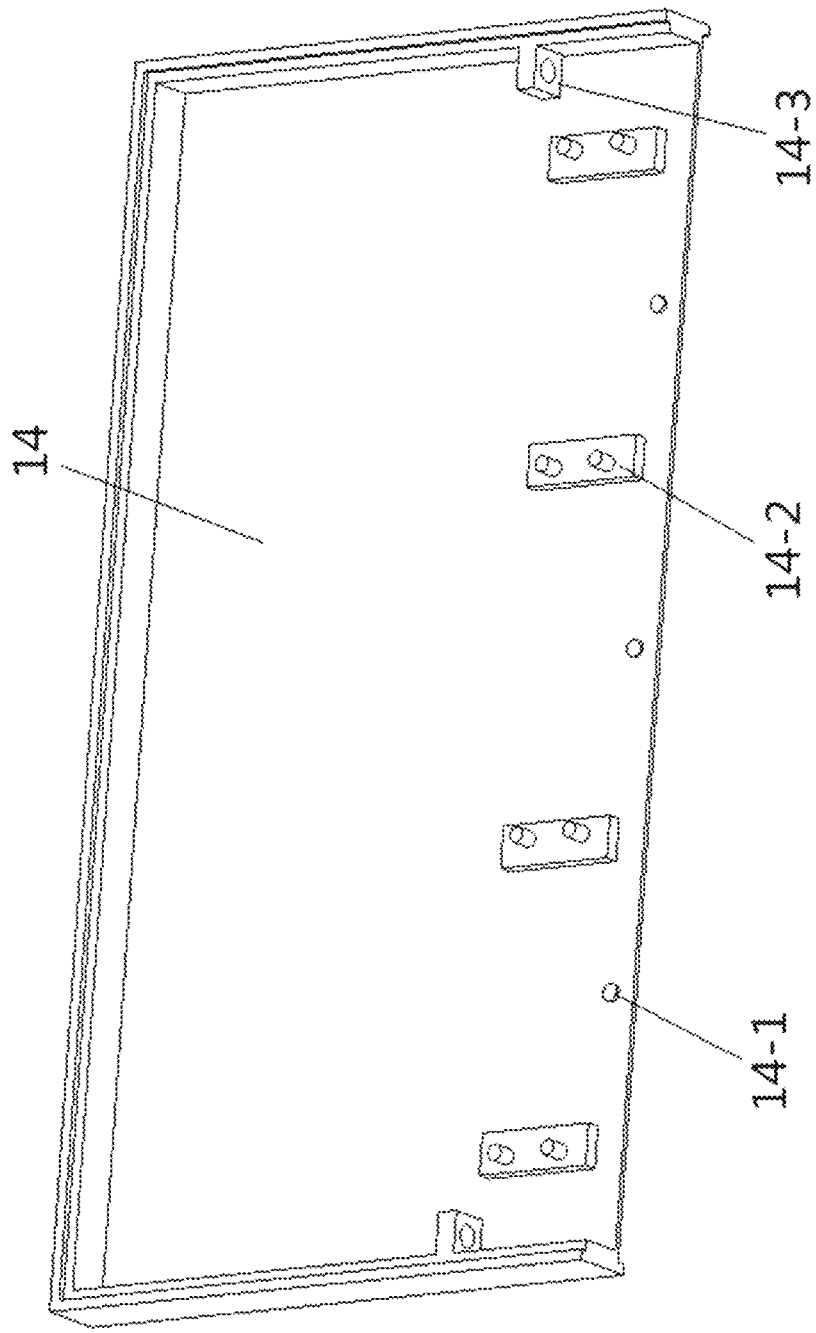
FIG. 12 is a perspective view of a frame in some embodiments according to the present disclosure.

In some embodiments, the pivotable support apparatus further includes a frame. In one example, the frame may be made of a unitary piece. In another example, the frame may include multiple (e.g., two) pieces. FIG. 12 is a perspective view of a frame is some embodiments according to the present disclosure. FIG. 12 depicts a frame that corresponds to one half of the pivotable support apparatus, for example, the pivotable support apparatus may include another frame that corresponds to another half of the pivotable support apparatus.

In some embodiment, the fame 14 is securely attached to the fast sliding plate and the second sliding plate. The frame 14 includes a plurality of positioning posts 14-1 configured to secure a resilient support with respect to the frame 14; a plurality of positioning protrusions 14-2 for securing the sliding plate (e.g., the first sliding plate 10A or the second sliding plate 105) and the sliding grooves (e.g., the first sliding groove sgv1, the second sliding groove sgv2, the third sliding groove sgv3, or the fourth sliding groove sgv4) therein; and holes 14-3 for receiving spring positioning bars 17 (see, e.g., FIG. 15B). The spring 18 is in contact with a portion of the frame 14 surrounding a respective hole of the boles 14-3, and applies a force to the frame 14. When a foldable display panel is disposed on the pivotable support apparatus, the force from the spring 18 facilitates spreading the foldable display panel when the pivotable support apparatus is in the unfolded state.

Figure 13:
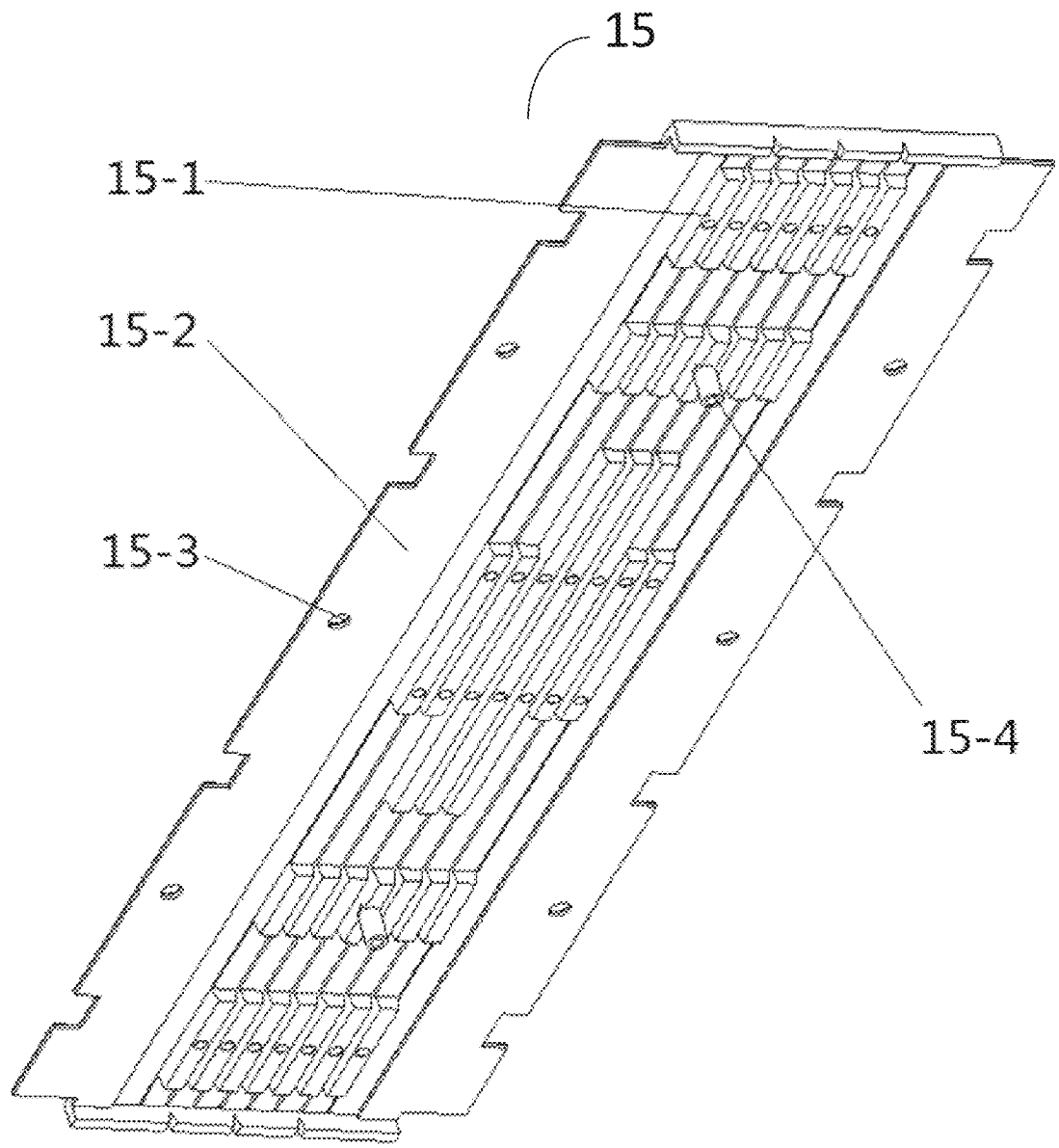
FIG. 13 is a perspective view of a resilient support in some embodiments according to the present disclosure.

In some embodiments, the pivotable support apparatus further includes a resilient support. FIG. 13 is a perspective view of a resilient support in some embodiments according to the present disclosure. Referring to FIG. 13, the resilient support 15 includes a resident material layer 15-2 and a plurality of rigid support bars 15-1 on a side of the resilient material layer 15-2 closes to the first shaft SF1 and the second that SF2. Referring to FIG. 1A, the pivotable support apparatus in some embodiments further includes a fastener 26 on a side of the fast shaft SF1 and the second shaft SF2 away from the plurality of rigid support bars 15-1. The resilient support 15 further includes a support post 15-4 configured to engage with the fastener 26 to secure the resilient support 15. By engaging the fastener 26 with the support post 15-4, it can prevent a foldable display panel from bulging in the folding region when the pivotable support apparatus is in the folded state.

The resilient material layer 15-2 may be made of any appropriate resilient material such as a rubber material. The resilient material layer 15-2 is configured to provide a flat surface. The plurality of rigid support bars 15-1 may be made of any appropriate rigid material such as steel.

In some embodiment, the resilient support 15 further includes a plurality of positioning holes 15-3. Referring to FIG. 12 and FIG. 13, the plurality of positioning posts 14-1 in the fame 14 are configured to respectively engage with the plurality of positioning boles 15-3 to secure the resilient support with respect to the frame 14.

Figure 14:
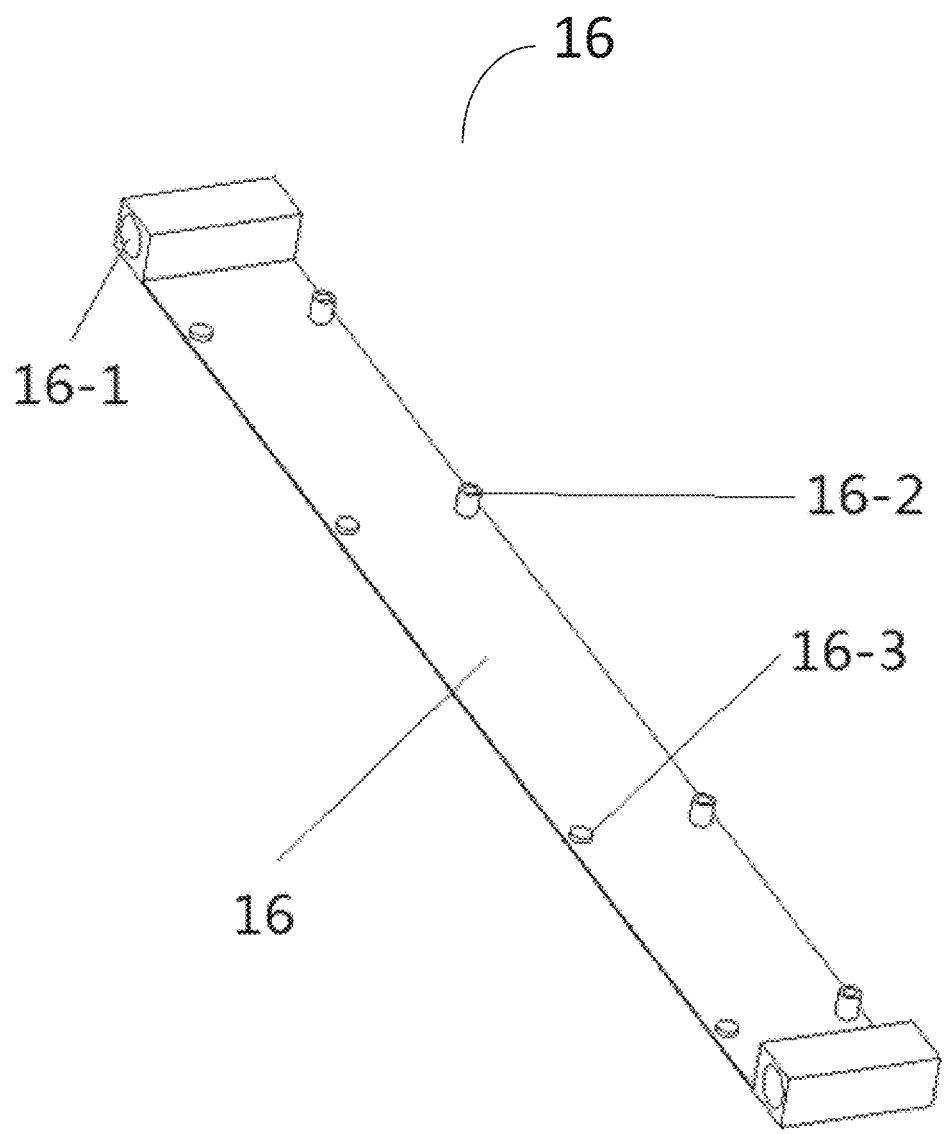
FIG. 14 is a perspective view of a cover in some embodiments according to the present disclosure.
Figure 15A:
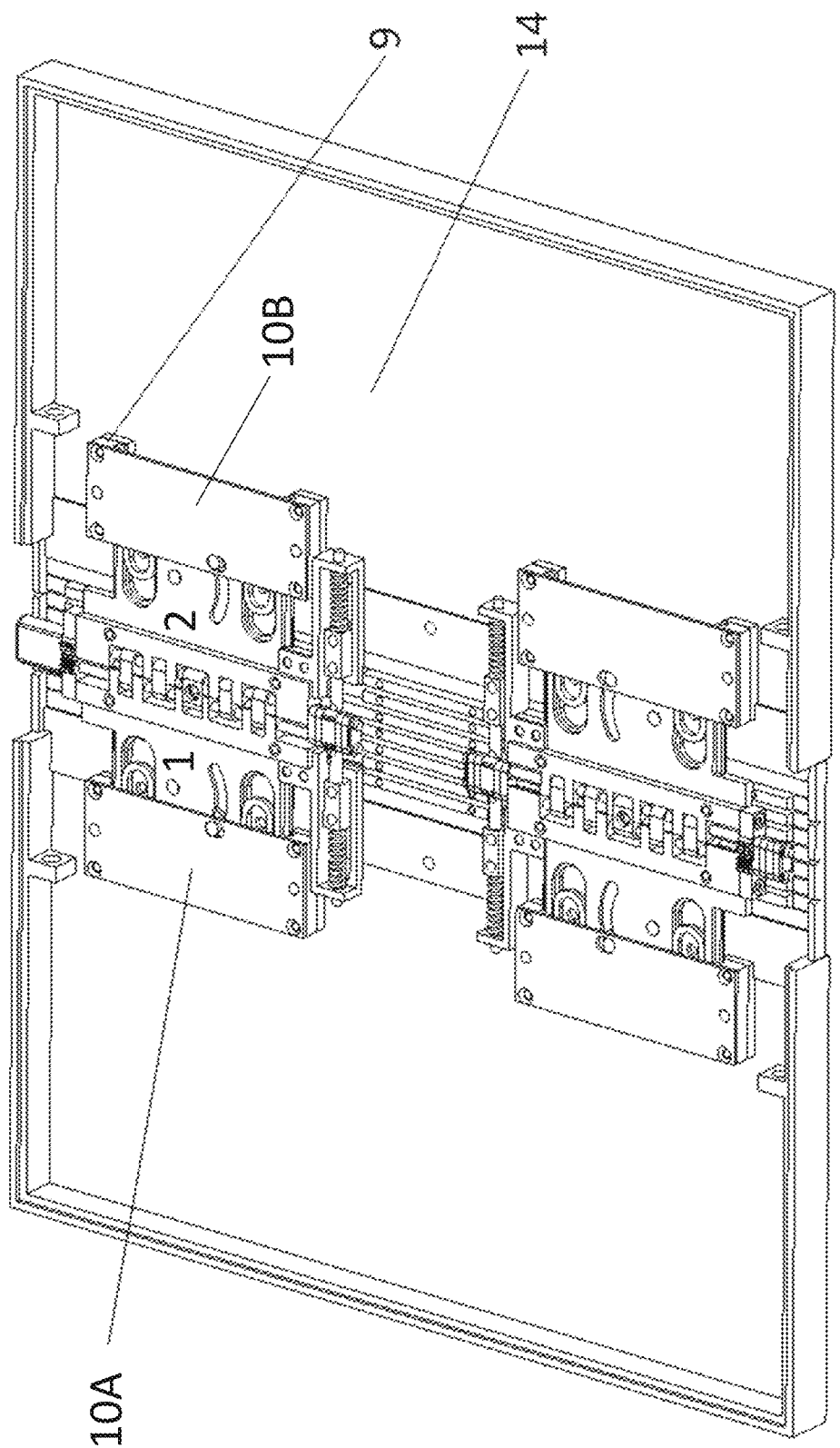
FIG. 15A illustrate a pivotable support apparatus without a cover in some embodiments according to the present disclosure.
Figure 15B:
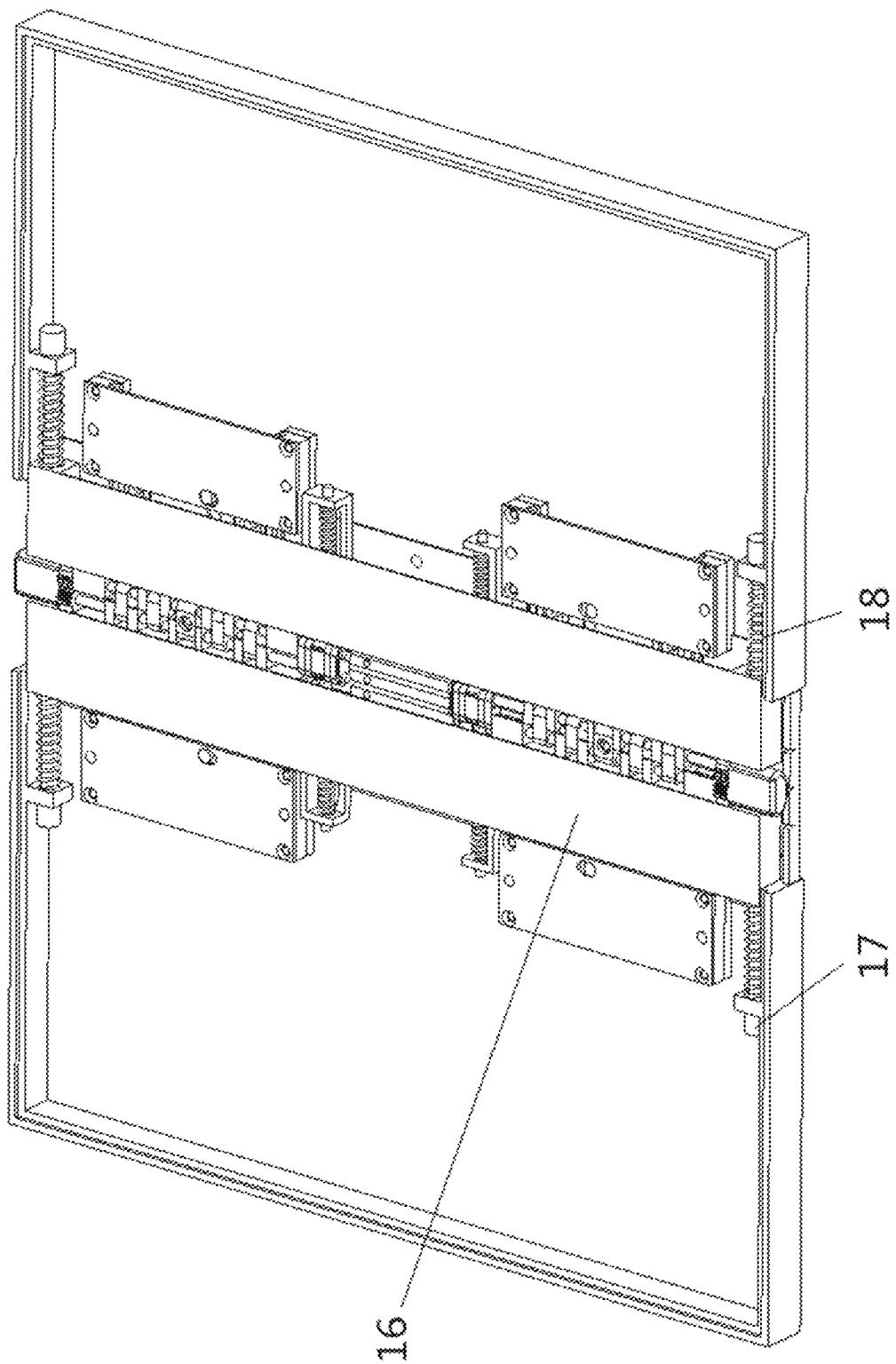
FIG. 15B illustrate a pivotable support apparatus with a cover in some embodiments according to the present disclosure.

In some embodiments, the pivotable support apparatus further includes a cover. Is one example, the cover may be made of a unitary piece. In another example, the cover may include multiple (e.g., two) pieces. FIG. 14 is a perspective view of a cover in some embodiments according to the present disclosure. FIG. 15A illustrate a pivotable support apparatus without a cover in some embodiments according to the present disclosure. FIG. 15B illustrate a pivotable support apparatus with a cover in some embodiments according to the present disclosure. FIG. 15B depicts a pivotable support apparatus having a cover with two pieces. Referring to FIG. 14, FIG. 15A, and FIG. 15B, the cover 16 in some embodiments at least partially covers the first rotating plate 1 and the second rotating plate 2.

In some embodiments, the cover 16 includes cover positioning posts 16-2. Referring to FIG. 4A and FIG. 48, the first rotating plate 1 in some embodiments includes first rotating plate positioning boles 1-4, the second rotating plate 2 is some embodiments includes second rotating plate positioning boles 2-4. In some embodiments, the cover positioning posts 16-2 are configured to engaged with rotating plate positioning boles to secure the cover onto the first rotating plate 1 and the second rotating plate 2.

In some embodiment, the cover 16 further includes cover positioning boles 16-1. Referring to FIG. 14, FIG. 10A, and FIG. 10B, the cover positioning boles 16-1 are configured to engage with the first cam bar 12A and the second cam bar 12B.

Figure 16:
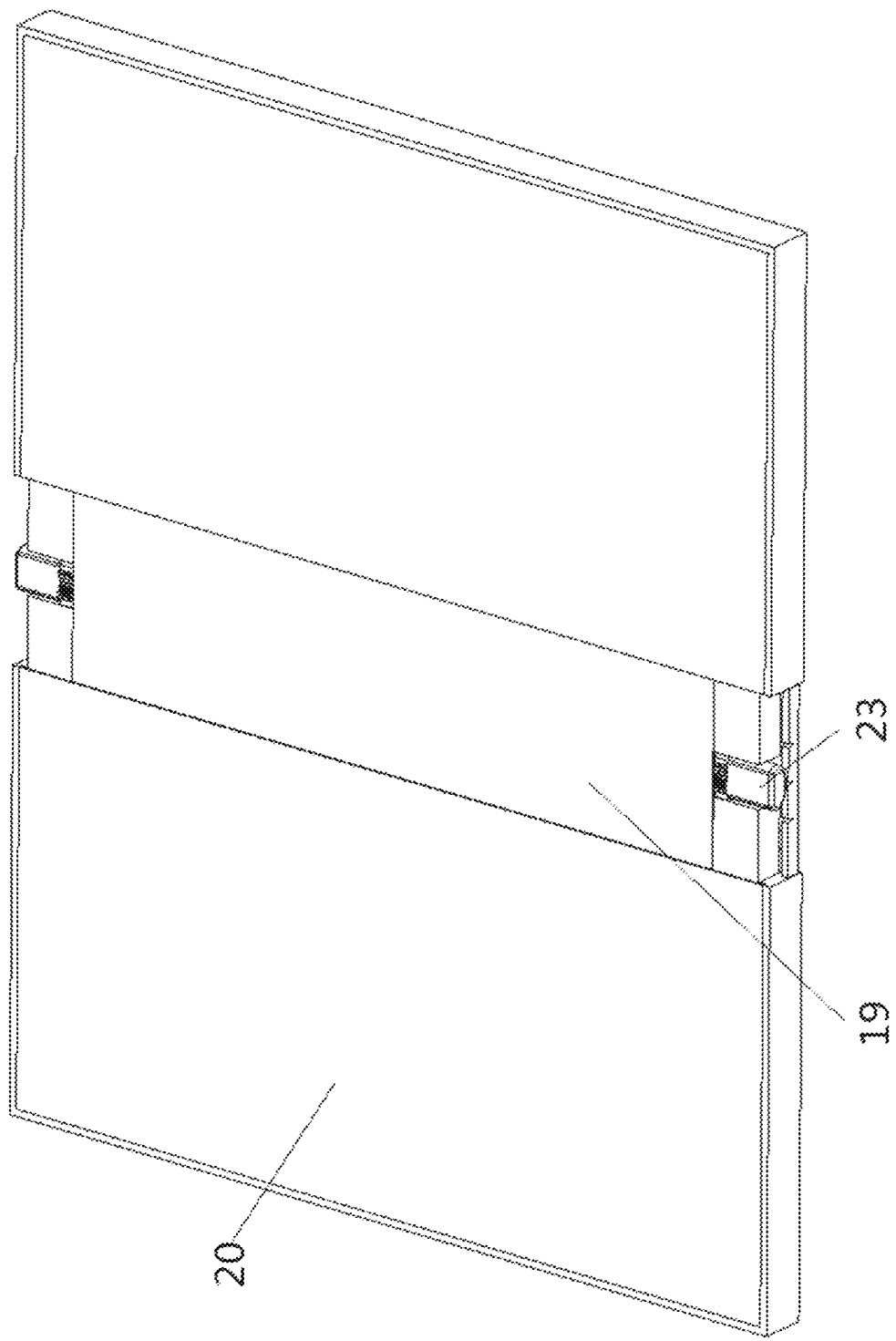
FIG. 16 is a back view of a pivotable support apparatus in some embodiments according to the present disclosure.

FIG. 16 is a back view of a pivotable support apparatus in some embodiments according to the present disclosure. Referring to FIG. 16, the pivotable support apparatus w some embodiments further includes a flexible film 19 attached on the cover. Referring to FIG. 14 and FIG. 16, the cover 16 in some embodiments further includes fin positioning posts 16-3 for securing the flexible fila 19.

Figure 17:
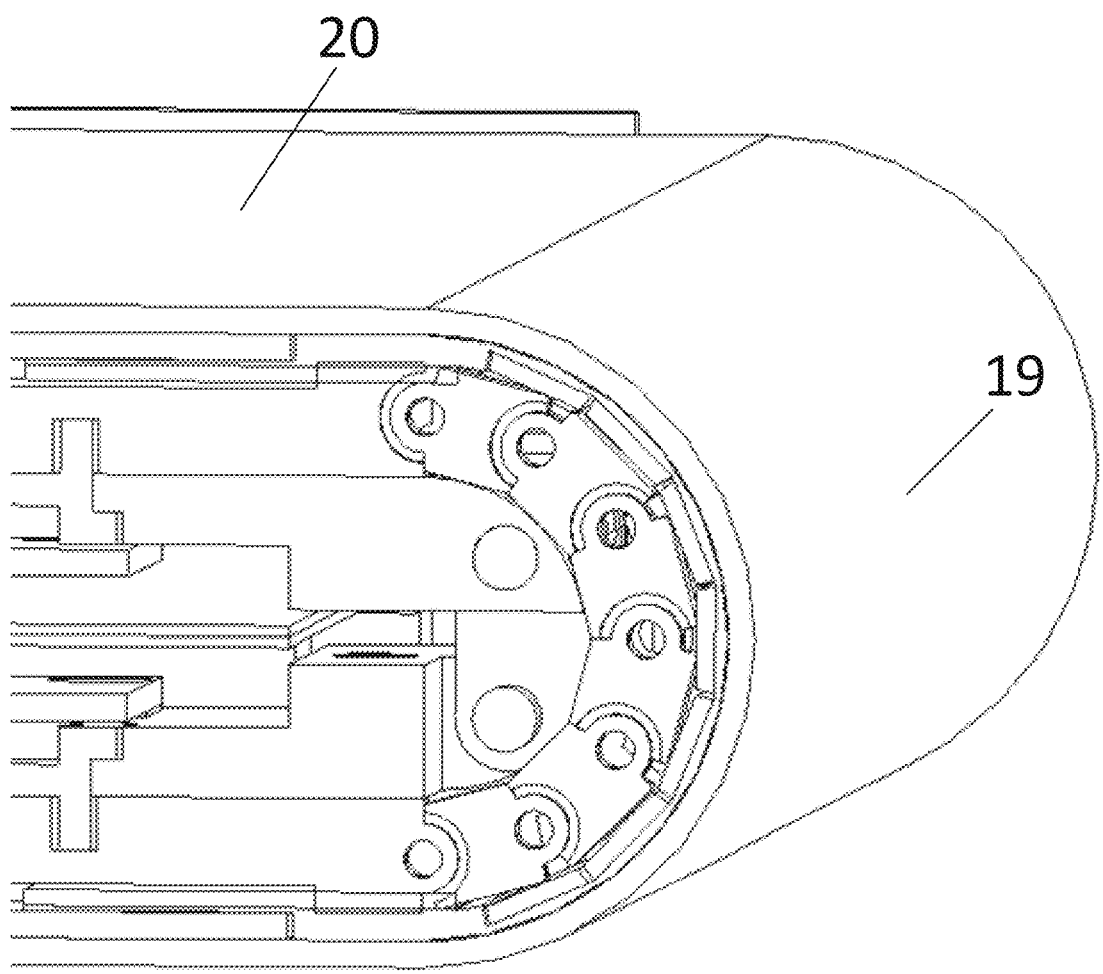
FIG. 17 is a perspective sectional view of a pivotable support apparatus in some embodiments according to the present disclosure.

FIG. 17 is a perspective sectional view of a pivotable support apparatus in some embodiments according to the present disclosure. Referring to FIG. 16 and FIG. 17, the pivotable support apparatus in some embodiments further includes a back cover 20 covering a back side of the pivotable support apparatus.

Referring to FIG. 1A and FIG. 16, the pivotable support apparatus in some embodiments further includes an end wrap 23 for covering ends of the first shaft SF1 and the second shaft SF2.

Referring to FIG. 1A, the pivotable support apparatus in some embodiments further inches a snap spring 22 on a side of the torque plate 21 away from the cam 13.

Figure 18A:
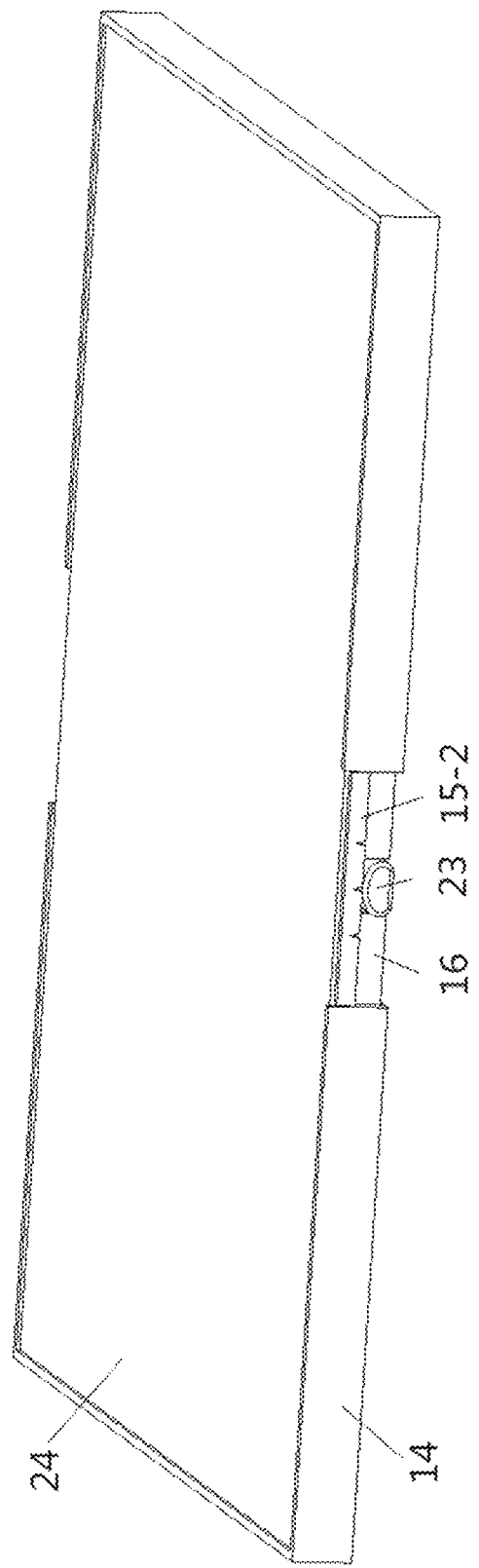
FIG. 18A is a schematic diagram illustrating the structure of a pivotable support apparatus in an unfolded state in some embodiments according to the present disclosure.
Figure 18B:
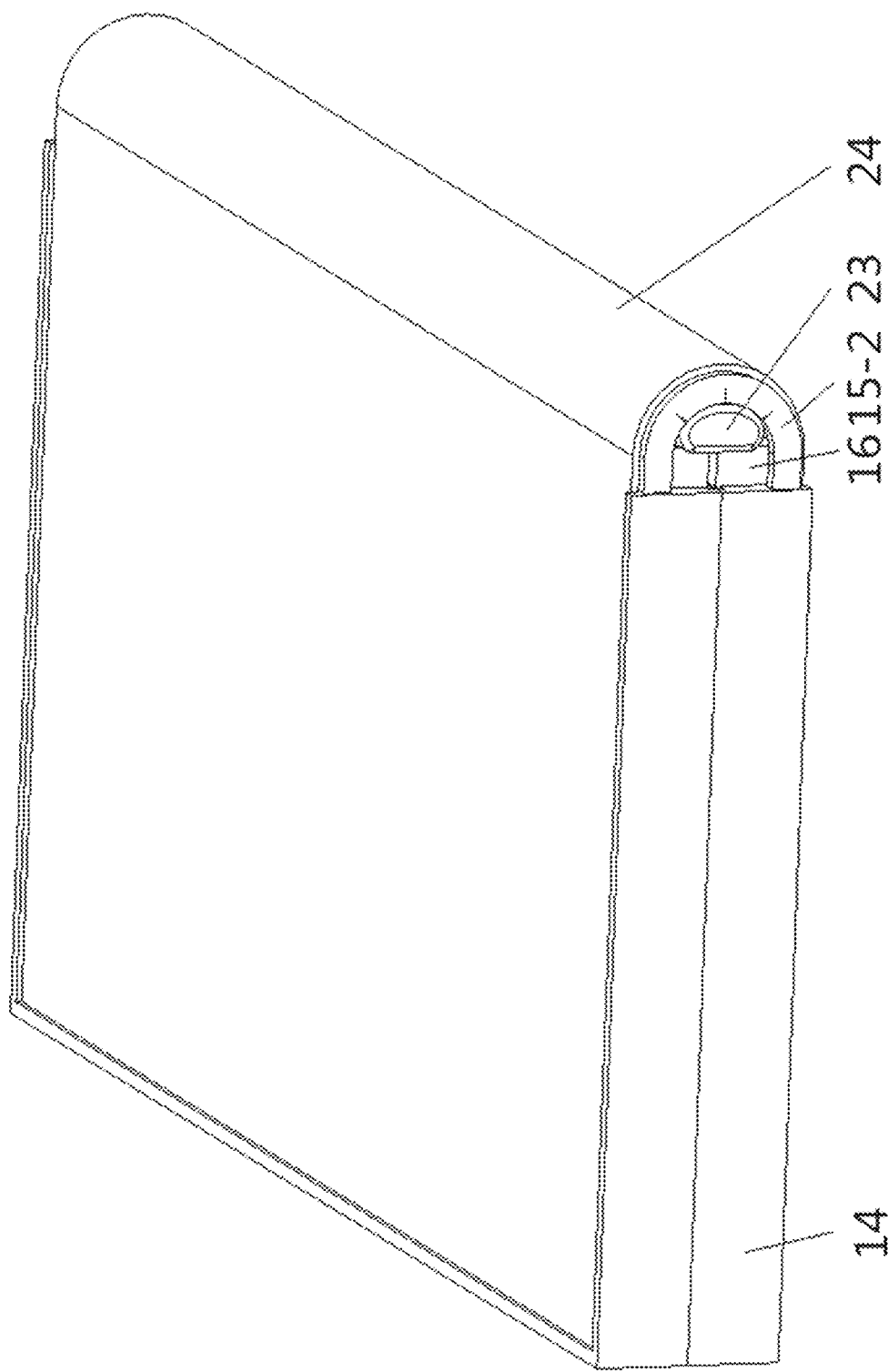
FIG. 18B is a schematic diagram illustrating the structure of a pivotable support apparatus in a folded state in some embodiments according to the present disclosure.

In another aspect, the present disclosure further provides a display apparatus including a folding display panel and a pivotable support apparatus described herein. FIG. 184 is a schematic diagram illustrating the structure of a pivotable support apparatus in an unfolded state in some embodiments according to the present disclosure. FIG. 18B is a schematic diagram illustrating the structure of a pivotable support apparatus in a folded state in some embodiments according to the present disclosure. Referring to FIG. 18A and FIG. 18B, the display apparatus is some embodiments includes a foldable display panel 24 received in the pivotable support apparatus. Optionally, the display panel is a liquid crystal display panel. Optionally, the display panel is as organic light emitting diode display panel. Optionally, the display panel is an electrophoretic display panel. Examples of appropriate display apparatuses include, but are not limited to, an electronic paper, a mobile phone, a tablet computer, a television, a monitor, a notebook computer, a digital album, a GPS, etc.

Is another aspect, the present invention provides a method of fabricating a pivotable support apparatus. In some embodiments, the method includes forming a binge structure comprising a first shaft and a second shaft respectively providing a first rotational axis and a second rotational axis parallel to each other, and forming a joint structure comprising at least one row of joints, a respective row of joints comprising a plurality of joints connected to each other. Optionally, is a folded state of the pivotable support apparatus, the respective row of joints curves around the hinge structure. Optionally, a respective joint of the plurality of joints comprises an upper portion and a lower portion, the upper portion being on a side of the lower portion away from the hinge structure. Optionally, the upper portion comprises an upper surface, a first upper side surface, and a second upper side surface. Optionally, contacts respectively between respective first upper side surfaces of respective upper portions of respective first adjacent joints and respective second upper side surfaces of respective upper portions of respective second adjacent joints define a limit to which the pivotable support apparatus can be unfolded.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which al terms are meant is their broadest reasonable sense unless otherwise indicated. Therefore, the term "the invention" "the present invention" or the like does not necessarily limit the claim scope to a specific embodiment, and the reference to exemplary embodiments of the invention does not imply & limitation on the invention, and no such limitation is to be inferred. The invention is limited only by the spirit and scope of the appended claims. Moreover, these claims may refer to use "first", "second", etc. following with noun or element. Suck terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pivotable support apparatus for supporting a foldable display panel, comprising:
    a hinge structure comprising a first shaft and a second shaft respectively providing a first rotational axis and a second rotational axis parallel to each other;
    a joint structure comprising at least one row of joints, a respective row of joints comprising a plurality of joints connected to each other;
    a first rotating plate; and
    a second rotating plate;
    wherein, in a folded state of the pivotable support apparatus, the respective row of joints curves around the hinge structure; and
    wherein, a respective joint of the plurality of joints comprises an upper portion and a lower portion, the upper portion being on a side of the lower portion away from the hinge structure;
    the upper portion comprises an upper surface, a first upper side surface, and a second upper side surface; and
    contacts respectively between respective first upper side surfaces of respective upper portions of respective first adjacent joints of the plurality of joints and respective second upper side surfaces of respective upper portions of respective second adjacent joints of the plurality of joints define a limit to which the pivotable support apparatus can be unfolded;
    wherein the first shaft is configured to rotate as the first rotating plate rotates, the second shaft is configured to rotate as the second rotating plate rotates; and
    wherein, in the folded state of the pivotable support apparatus, the first rotating plate and the second rotating plate are cooperatively configured to form a curved surface, the respective row of joints is configured to be at least partially supported by the curved surface;
    wherein the first rotating plate comprises a first main body and a first connecting disc protruding from a first side surface of the first main body;
    the second rotating plate comprises a second main body and a second connecting disc protruding from a second side surface of the second main body;
    the first rotating plate comprises a first hole extending through the first connecting disc, the first shaft extending through the first hole to connect the first rotating plate with the first shaft; and
    the second rotating plate comprises a second hole extending through the second connecting disc, the second shaft extending through the second hole to connect the second rotating plate with the second shaft.

2. The pivotable support apparatus of claim 1, wherein, in an unfolded state of the pivotable support apparatus, upper surfaces of upper portions of the plurality of joints are substantially co-planar; and
    a respective first upper side surface of a respective upper portion of a respective first adjacent joint is in contact with a respective second upper side surface of a respective upper portion of a respective second adjacent joint.

3. The pivotable support apparatus of claim 1, wherein the lower portion comprises a lower surface, a first lower side surface, and a second lower side surface; and
    contacts respectively between respective first lower side surfaces of respective lower portions of the respective first adjacent joints and respective second lower side surfaces of respective lower portions of the respective second adjacent joints define a limit to which the pivotable support apparatus can be folded.

4. The pivotable support apparatus of claim 1, wherein, in the folded state of the pivotable support apparatus, upper surfaces of upper portions of the plurality of joints form portions of a curved surface; and
    a respective first lower side surface of a respective lower portion of a respective first adjacent joint is in contact with a respective second lower side surface of a respective lower portion of a respective second adjacent joint.

5. The pivotable support apparatus of claim 1, further comprising:
    a first cam bar;
    a second cam bar; and
    a cam comprising a first notch, a second notch, a third notch, and a fourth notch;
    wherein, in an unfolded state of the pivotable support apparatus, the first cam bar is configured to be engaged with the first notch, and the second cam bar is configured to be engaged with the second notch; and
    in the folded state of the pivotable support apparatus, the first cam bar is configured to be engaged with the third notch, and the second cam bar is configured to be engaged with the fourth notch.

6. A display apparatus, comprising a foldable display panel and a pivotable support apparatus of claim 1.

7. A pivotable support apparatus for supporting a foldable display panel, comprising:
    a hinge structure comprising a first shaft and a second shaft respectively providing a first rotational axis and a second rotational axis parallel to each other;
    a joint structure comprising at least one row of joints, a respective row of joints comprising a plurality of joints connected to each other;
    a first rotating plate; and
    a second rotating plate;
    wherein, in a folded state of the pivotable support apparatus, the respective row of joints curves around the hinge structure; and
    wherein, a respective joint of the plurality of joints comprises an upper portion and a lower portion, the upper portion being on a side of the lower portion away from the hinge structure;
    the upper portion comprises an upper surface, a first upper side surface, and a second upper side surface; and
    contacts respectively between respective first upper side surfaces of respective upper portions of respective first adjacent joints of the plurality of joints and respective second upper side surfaces of respective upper portions of respective second adjacent joints of the plurality of joints define a limit to which the pivotable support apparatus can be unfolded;
    wherein the first shaft is configured to rotate as the first rotating plate rotates, the second shaft is configured to rotate as the second rotating plate rotates; and
    wherein, in the folded state of the pivotable support apparatus, the first rotating plate and the second rotating plate are cooperatively configured to form a curved surface, the respective row of joints is configured to be at least partially supported by the curved surface;
    wherein the joint structure comprises a first row of joints and a second row of joints; and
    in the folded state of the pivotable support apparatus, the first row of joints is at least partially supported by the first connecting disc, the second row of joints is at least partially supported by the second connecting disc.

8. The pivotable support apparatus of claim 7, wherein the lower portion comprises a lower surface, a first lower side surface, and a second lower side surface; and in the folded state of the pivotable support apparatus, lower surfaces of joints in the first row of joints is not in contact with the second connecting disc, and lower surfaces of joints in the second row of joints is not in contact with the first connecting disc.

9. A pivotable support apparatus for supporting a foldable display panel, comprising:
a hinge structure comprising a first shaft and a second shaft respectively providing a first rotational axis and a second rotational axis parallel to each other;
a joint structure comprising at least one row of joints, a respective row of joints comprising a plurality of joints connected to each other;
a first rotating plate;
a second rotating plate;
a first support plate; and
a second support plate;
wherein, in a folded state of the pivotable support apparatus, the respective row of joints curves around the hinge structure; and
wherein, a respective joint of the plurality of joints comprises an upper portion and a lower portion, the upper portion being on a side of the lower portion away from the hinge structure;
the upper portion comprises an upper surface, a first upper side surface, and a second upper side surface; and
contacts respectively between respective first upper side surfaces of respective upper portions of respective first adjacent joints of the plurality of joints and respective second upper side surfaces of respective upper portions of respective second adjacent joints of the plurality of joints define a limit to which the pivotable support apparatus can be unfolded;
wherein the first shaft is configured to rotate as the first rotating plate rotates, the second shaft is configured to rotate as the second rotating plate rotates; and
wherein, in the folded state of the pivotable support apparatus, the first rotating plate and the second rotating plate are cooperatively configured to form a curved surface, the respective row of joints is configured to be at least partially supported by the curved surface;
wherein the first shaft is configured to rotate as the first support plate and the first rotating plate rotate, the second shaft is configured to rotate as the second support plate and the second rotating plate rotate; and
two opposite ends of the respective row of joints are respectively attached to the first support plate and the second support plate.

10. The pivotable support apparatus of claim 9, wherein the first rotating plate comprises a first main body and a first connecting disc protruding from a first side surface of the first main body;
the second rotating plate comprises a second main body and a second connecting disc protruding from a second side surface of the second main body;
the first main body comprises a third side surface connected to the first side surface, the third side surface at least partially supporting the first support plate; and
the second main body comprises a fourth side surface connected to the second side surface, the fourth side surface at least partially supporting the second support plate.

11. The pivotable support apparatus of claim 9, wherein the first rotating plate and the first support plate are configured to move relative to each other as the first rotating plate rotates about the first rotational axis; and
the second rotating plate and the second support plate are configured to move relative to each other as the second rotating plate rotates about the second rotational axis.

12. The pivotable support apparatus of claim 11, further comprising a first mount and a second mount;
wherein the first rotating plate comprises a first slot, the first support plate comprises a second slot, the first mount extends through the first slot and at least partially into the second slot;
the second rotating plate comprises a third slot, the second support plate comprises a fourth slot, the second mount extends through the third slot and at least partially into the fourth slot;
the first slot and the second slot limit a movement of the first mount in a space provided by the first slot and the second slot; and
the third slot and the fourth slot limit a movement of the second mount in a space provided by the third slot and the fourth slot.

13. The pivotable support apparatus of claim 11, further comprising a first sliding plate mounted onto the first rotating plate and a second sliding plate mounted onto the second rotating plate.

14. The pivotable support apparatus of claim 13, further comprising a first rotating rod and a second rotating rod;
the first rotating rod comprises a first rod main body, a first limiting post, a second limiting post, and a third limiting post, wherein the second limiting post protrudes from a side of the first rod main body opposite to a side from which the first limiting post and the third limiting post protrude;
the second rotating rod comprises a second rod main body, a fourth limiting post, a fifth limiting post, and a sixth limiting post, wherein the fifth limiting post protrudes from a side of the second rod main body opposite to a side from which the fourth limiting post and the sixth limiting post protrude;
the first rotating plate comprises a first receiving slot configured to receive at least the first rod main body; and
the second rotating plate comprises a second receiving slot configured to receive at least the second rod main body.

15. The pivotable support apparatus of claim 14, wherein the first rotating plate further comprises a first dent inside a region of the first receiving slot, the first dent configured to receive the first limiting post, the first limiting post extending at least partially into the first dent, thereby connecting the first limiting post to the first rotating plate; and
the second rotating plate further comprises a second dent inside a region of the second receiving slot, the second dent configured to receive the fourth limiting post, the fourth limiting post extending at least partially into the second dent, thereby connecting the fourth limiting post to the second rotating plate.

16. The pivotable support apparatus of claim 14, wherein the first support plate comprises a first post hole configured to receive the second limiting post, the second limiting post extends at least partially into the first post hole thereby connecting the second limiting post to the first support plate; and
the second support plate comprises a second post hole configured to receive the fifth limiting post, the fifth limiting post extends at least partially into the second post hole thereby connecting the fifth limiting post to the second support plate.

17. The pivotable support apparatus of claim 14, wherein the first sliding plate comprises a third post hole configured to receive the third limiting post;
- the first rotating plate further comprises a first groove inside a region of the first receiving slot;
- the third limiting post extends through the first groove and at least partially into the third post hole, the first groove configured to allow movement of the third limiting post in a space provided by the first groove;
- the second sliding plate comprises a fourth post hole configured to receive the sixth limiting post;
- the second rotating plate further comprises a second groove inside a region of the second receiving slot; and
- the sixth limiting post extends through the second groove and at least partially into the fourth post hole, the second groove configured to allow movement of the sixth limiting post in a space provided by the second groove.

18. The pivotable support apparatus of claim 13, wherein the first sliding plate comprises a first sliding groove and a second sliding groove facing each other;
- the second sliding plate comprises a third sliding groove and a fourth sliding groove facing each other;
- the first sliding groove and the second sliding groove are configured to respectively receive two portions of the first rotating plate, allowing the first rotating plate to move relatively to the first sliding plate; and
- the third sliding groove and the fourth sliding groove are configured to respectively receive two portions of the second rotating plate, allowing the second rotating plate to move relatively to the second sliding plate.

* * * * *